US010372091B2

(12) United States Patent
Miller, Jr.

(10) Patent No.: US 10,372,091 B2
(45) Date of Patent: Aug. 6, 2019

(54) HIGH PRESSURE ENHANCED STRUCTURE TECHNOLOGY

(71) Applicant: Robert A. Miller, Jr., Wheeling, WV (US)

(72) Inventor: Robert A. Miller, Jr., Wheeling, WV (US)

(*) Notice: Subject to any disclaimer, the term of this patent is extended or adjusted under 35 U.S.C. 154(b) by 1068 days.

(21) Appl. No.: 14/688,252

(22) Filed: Apr. 16, 2015

(65) Prior Publication Data
US 2015/0300440 A1    Oct. 22, 2015

Related U.S. Application Data

(60) Provisional application No. 61/981,340, filed on Apr. 18, 2014.

(51) Int. Cl.
| B64C 1/00 | (2006.01) |
| E04H 9/04 | (2006.01) |
| B60N 2/427 | (2006.01) |
| E04H 15/20 | (2006.01) |
| G05B 15/02 | (2006.01) |

(52) U.S. Cl.
CPC ......... *G05B 15/02* (2013.01); *B60N 2/42709* (2013.01); *B64C 1/00* (2013.01); *E04H 9/04* (2013.01); *E04H 15/20* (2013.01)

(58) Field of Classification Search
CPC ......... E04H 15/20; E04H 9/04; B65D 81/245; G05B 15/02; B60N 2/42709; B64C 1/00; F17C 5/02
USPC ......................................................... 137/590
See application file for complete search history.

(56) References Cited

U.S. PATENT DOCUMENTS

| 4,120,151 | A | 10/1978 | Quigley, Jr. |
| 5,143,340 | A | 9/1992 | Wood et al. |
| 5,798,156 | A | 8/1998 | Mitlitsky et al. |
| 5,908,141 | A * | 6/1999 | Teel .................. F17C 5/06 141/18 |
| 6,062,143 | A | 5/2000 | Grace et al. |
| 6,463,699 | B1 | 10/2002 | Bailey et al. |

(Continued)

FOREIGN PATENT DOCUMENTS

WO    9603265    2/1996

OTHER PUBLICATIONS

International Search Report for PCT/US2015/026121 dated Jul. 13, 2015.

(Continued)

*Primary Examiner* — Angelisa L. Hicks
(74) *Attorney, Agent, or Firm* — Buchanan Ingersoll & Rooney PC; Craig G. Cochenour, Esq.

(57) ABSTRACT

An energy dissipating article of manufacture is disclosed that is a high pressure enhanced structure technology comprising a structure having at least one wall forming a sealed inner chamber, and either (i) the sealed inner chamber is filled with a gas under pressure, or (ii) an inflated bladder filled with gas is located within the sealed inner chamber, or (iii) a deflated bladder that is located within the sealed inner chamber, and an inflation system that produces a gas to inflate the deflated bladder, or (iv) the sealed inner chamber at one atmosphere standard normal pressure, and an inflation system that produces a gas, to pressurize the inner chamber. A method of making the articles of manufacture and uses thereof are disclosed.

47 Claims, 21 Drawing Sheets

(56) References Cited

U.S. PATENT DOCUMENTS

| | | | |
|---|---|---|---|
| 6,764,595 B1* | 7/2004 | Halemba | B01D 61/08 137/590 |
| 7,622,207 B2* | 11/2009 | Kaye | F17C 3/00 429/483 |
| 2004/0060304 A1 | 4/2004 | Aceves et al. | |
| 2010/0170907 A1* | 7/2010 | Westenberger | F17C 7/00 220/586 |
| 2011/0101010 A1 | 5/2011 | Maiocco | |
| 2013/0095225 A1* | 4/2013 | LeBaron | A23L 3/0155 426/665 |
| 2014/0150937 A1* | 6/2014 | Favalora, III | B60J 11/04 150/166 |

OTHER PUBLICATIONS

Extended European Search Report dated Dec. 22, 2017 for EP Application No. 15780377.6 filed Apr. 16, 2015.

* cited by examiner

HIGH PRESSURE ENHANCED STRUCTURE TECHNOLOGY

CROSS-REFERENCE TO RELATED APPLICATION

This utility patent application claims the benefit of U.S. Provisional Patent Application Ser. No. 61/981,340, filed on Apr. 18, 2014. The entire contents of U.S. Provisional Patent Application Ser. No. 61/981,340 is incorporated by reference into this utility patent application as if fully written herein.

BACKGROUND OF THE INVENTION

1. Field of the Invention

This invention provides for a pressure enhanced structure that improves the weight to strength ratio of the structure. Preferably, this invention discloses an energy dissipating article of manufacture that provides a high pressure enhanced structure (hereinafter referred to as "HPEST". "HPEST" is a trademark owned by Robert A, Miller, Jr, applicant and inventor of this technology) wherein a gas under pressure is placed within a sealed structure. A method of using the high pressure enhanced structure and a method of manufacturing the high pressure enhanced structure are also disclosed.

2. Description of the Background Art

It is known in the art that building a structure, for example but not limited to a frame or body of a vehicle, boat, or aircraft and component parts of the vehicle, boat, or aircraft, or the framework of a physical building, or the framework for any device or item of manufacture, entails taking into account the weight of the structure and the strength of the structure. The weight to strength ratio of the structure is important for many reasons, some of which are highlighted below. It is known in the art to use materials with the highest specific strengths to build a structure. Materials with high specific strengths are for example but not limited to fibers such as for example carbon fiber, glass fiber, and various polymers, and these are frequently used to make composite materials such as for example carbon fiber epoxy. These type of high strength materials and others such as titanium, magnesium, aluminum, and high strength steel alloys are widely used in the construction industries, vehicle and aircraft manufacturing, and aerospace.

In the manufacture of a structure that is capable of movement, for example but not limited to an automobile, truck, heavy construction equipment, airplane or helicopter, the finding a safe compromise between low weight and high strength is critical. The structures must be light yet strong and stiff enough to resist the various forces acting on the automobile, truck, heavy construction equipment on land during movement ((i.e. travel at various speeds) or the airplane or helicopter during flight. They must also be durable enough to withstand these forces over the structures entire life span. Many of these structures design focus is to make them weigh as little as possible. Materials engineers study materials, both conventional and composite for use in these structures. Some areas of concern are the strength and rigidity of the material, its availability, its ease of processing, and its resistance to temperature and fatigue. The structures are designed taking into account a design that has a carefully planned compromise in which many competing factors are traded against one another: payload capacity, cost, range, speed, fuel economy, durability, noise levels, and required runway length (in the case of airplanes), and many others. The best design typically provides maximum performance at the lowest weight. The present invention improves the weight to strength ratio of structures that may be used for any application and that may be made from any type of material where weight savings and higher strength are desired.

SUMMARY OF THE INVENTION

The present invention provides an article of manufacture having an improved weight to strength ratio comprising a structure having at least one wall forming a sealed inner chamber and a gas that is located within the sealed inner chamber for improving the weight to strength ratio of the structure. Preferably, this sealed inner chamber has a gas in the chamber under pressure. More preferably, this article of manufacture includes wherein the pressure of the sealed inner chamber is either a positive pressure or a neutral pressure of about 1 atmosphere. In a most preferably embodiment of this invention, the article of manufacture, as described herein, includes wherein the sealed inner chamber contains at least one port wherein the port has one end that extends through at least one opening of at least one wall that forms the sealed inner chamber wherein the port has a valve that allows for the addition of gas into the inner chamber or allows for the escape of gas out of the inner chamber, and wherein the port is in sealed engagement with the opening located within at least one wall of the structure. In another embodiment of this invention, as described herein, the article of manufacture includes wherein the port has one end (i.e. a first end) that is external to the wall of the structure wherein the one end of the port accommodates a first end of a tube that is in sealed engagement with the one end of the port, and wherein the tube has a second end, wherein the second end of the tube accommodates the outlet of a compressor or a gas storage cylinder and wherein the outlet of the compressor or gas storage cylinder is in sealed engagement with the second end of the tube, the compressor or gas storage cylinder supplying gas under pressure through the tube and from the tube into the port and through the valve of the port when the valve is in an open position, and into the inner chamber.

In another embodiment of the article of manufacture of the present invention, as described herein, the article of manufacture has a sealed bladder located within the sealed inner chamber, and wherein the sealed bladder contains a gas. Preferably, the article of manufacture, as described herein, has the sealed bladder with the gas under pressure. The pressure of the sealed bladder is either a positive pressure or a neutral pressure of about 1 atmosphere. In a most preferred embodiment of this invention, the article of manufacture of claim, as described herein, has the sealed bladder having at least one port wherein the port has one end (i.e. a first end) that extends through at least one opening of the wall of the sealed bladder and through at least one opening of the wall of the sealed inner chamber wherein the port has a valve that allows for the addition of gas into the sealed bladder or allows for the escape of gas out of the sealed bladder, and wherein the port is in sealed engagement with the opening of the wall of the sealed bladder, or with the opening of the wall of the sealed inner chamber, or with the opening of the wall of the sealed bladder and the opening of the wall of the sealed inner chamber. Another embodiment of this invention, provides an article of manufacture, as described herein, wherein the article of manufacture further includes wherein the one end of the port extends through the opening in the wall of the inner chamber, wherein the one end of the port accommodates a first end of a tube and wherein the first end of the tube is in sealed engagement with the one end of the port, and wherein the tube has a second end, wherein the second end of the tube accommodates the outlet of a compressor or a gas storage cylinder, and wherein the outlet of the compressor or gas storage cylinder is in sealed engagement with the second end of the tube, and wherein the compressor or a gas storage cylinder supplies a gas under pressure through the tube into the port and through the valve of the port when the valve is in an open position, and into the sealed bladder.

Another embodiment of this invention provides an article of manufacture, as described herein, that includes one or more sensors located within the sealed inner chamber for monitoring the pressure of the gas within the sealed inner chamber. Preferably, the one or more sensors are located within the sealed inner chamber for monitoring the pressure of the gas within the sealed inner chamber. More preferably, the one or more sensors are located within the sealed bladder for monitoring the pressure within the sealed bladder. Most preferably, the article of manufacture, as described herein, includes wherein one or more sensors are located within the sealed bladder for monitoring the pressure within the sealed bladder and wherein one or more sensors are located within the sealed inner chamber for monitoring the pressure of the sealed inner chamber.

In yet another embodiment of this invention, an article of manufacture is provided, as described herein, including a computer processor for receiving data transmitted from one or more sensors located within the sealed bladder, or sealed inner chamber, or a combination of sensors located with the sealed inner chamber and the sealed bladder, to the computer, wherein the computer processor is interfaced (linked to) with the compressor or the gas storage cylinder and the valve of the port, wherein the computer processor adjusts or maintains the pressure at a desired level within the inner chamber by activation of the compressor or the gas storage cylinder and the opening and closing of the valve of the port.

Another embodiment of this invention provides for an article of manufacture having an improved weight to strength ratio comprising a structure having at least one wall forming a sealed inner chamber, and a bladder that is in a deflated position located within the sealed inner chamber, wherein the deflated bladder has an inflation system that produces a gas to inflate the deflated bladder upon receiving a signal from a sensor, wherein the sensor is in communication with the deflated bladder, and wherein the sensor is located either within the structure or is located external to the structure, and wherein the sensor is optionally in communication with a computer processor. Preferably, the sensor is located either externally of the sealed inner chamber or within the sealed inner chamber. In a more preferred embodiment of this article of manufacture, as described herein, the inflation system comprises a solid propellant and an igniter. The igniter receives a signal from the sensor which causes the solid propellant to produce a gas wherein the gas inflates the deflated airbag to an inflated airbag under positive pressure or to a neutral pressure of one atmosphere. In a most preferred embodiment, the article of manufacture, as described, herein includes wherein the solid propellant is for example sodium azide (NaN3) and potassium nitrate (KNO3). In this most preferred embodiment of the article of manufacture, the igniter receives a signal from the sensor which causes the solid propellant of sodium azide (NaN3) and potassium nitrate (KNO3) to react to produce nitrogen gas wherein the nitrogen gas inflates the deflated bladder to an inflated bladder under pressure, and most preferably, a positive pressure or to a neutral pressure of one atmosphere (1 atm).

An article of manufacture is disclosed providing a structure having at least one wall forming a sealed inner chamber, and either (i) the sealed inner chamber is filled with a gas under pressure, or (ii) an inflated bladder filled with gas is located within the sealed inner chamber, or (iii) a bladder that is in a deflated position is located within the sealed inner chamber, and wherein the deflated bladder has an inflation system that produces a gas to inflate the deflated bladder upon receiving a signal from a sensor, wherein the sensor is optionally linked to a computer processor, or (iv) the sealed inner chamber has no additional added gas but is at 1 atm standard normal pressure, and has an inflation system that produces a gas, to pressurize inner chamber upon receiving a signal from a sensor, wherein the sensor is optionally linked to a computer processor.

Other embodiments of the present invention provide a method of making an article of manufacture having an improved weight to strength ratio comprising forming an article of manufacture having an improved weight to strength ratio comprising a structure having at least one wall that forms a sealed inner chamber, and inserting a gas into the inner chamber before it is sealed for making an article of manufacture having an improved weight to strength ratio. Preferably, this method includes wherein the sealed inner chamber has the gas in the inner chamber under pressure. More preferably, this method includes wherein the pressure of the sealed inner chamber having the gas is either a positive pressure or a neutral pressure of about 1 atmosphere. In a preferred embodiment of this invention, the method of making the article of manufacture, as described herein, further includes providing the sealed inner chamber with a port wherein the port has one end (i.e. a first end) that extends through at least one opening of at least one wall of the sealed inner chamber and wherein the port has a valve that allows for the addition of gas into the inner chamber or allows for the escape of gas out of the inner chamber when the valve is placed in an open position. This method preferably includes providing the port having a portion of the one end of the port be external to the wall of the structure wherein a portion of the one end of the port accommodates a first end of a tube for receiving a gas. This method preferably further includes providing one or more sensors located within the sealed inner chamber for monitoring the pressure of said gas within the sealed inner chamber. More preferably, this method includes mounting one or more of the sensors to an interior portion of the wall of the inner chamber for monitoring the pressure of the gas within the sealed inner chamber. Another embodiment of this method of making an article of manufacture includes providing the sensors for transmitting data to a computer processor concerning the pressure within the sealed inner chamber. In yet another more preferable embodiment of this invention, the method of making an article of manufacture includes providing a computer processor for receiving data transmitted from one or more of the sensors to the computer processor, and providing the computer processor with a computer interface wherein the computer interface is linked to a compressor or gas storage cylinder and the valve of the port, wherein the compressor or gas storage cylinder is in communication with a first end of a tube and wherein a second end of the tube is in communication with a portion of the one end (i.e. a portion of the first end of the port) of the port, and wherein the computer processor adjusts or maintains the pressure at a desired level within the inner chamber by activation of the compressor or gas storage cylinder sending the gas through the tube and activation of the valve from a closed position to an open position for allowing the gas to flow from the second end of the tube through the open valve of the port into the sealed inner chamber.

Another embodiment of this invention provides a method of making an article of manufacture having an improved weight to strength ratio comprising providing a structure having at least one wall for forming an inner chamber, inserting a sealed bladder within the inner chamber, and sealing the inner chamber of the structure having the bladder located within the inner chamber for forming a sealed inner chamber having the bladder for making an article of manufacture having an improved weight to strength ratio. In a further embodiment of this method of this invention, as described herein, the method includes placing a gas within the bladder prior to sealing the bladder and prior to inserting the sealed bladder into the inner chamber. Preferably, this method of making includes providing the gas under pressure in the sealed bladder. More preferably, this method of making includes providing the gas in either a positive pressure or a neutral pressure of about 1 atmosphere within the sealed bladder. In another embodiment of this method of making an article of manufacture, as described herein, the method further includes providing a port located within a wall of the sealed bladder wherein the port has one end (i.e. a first end) that extends through at least one opening of the wall of the sealed bladder and through at least one opening in at least one wall of the sealed inner chamber of the structure wherein the port has a valve that allows for the addition of gas into the sealed bladder or allows for the escape of gas out of the sealed bladder, and wherein the port is in sealed engagement with the opening of the wall of the sealed bladder and the opening of the wall of the inner chamber of the structure. This method further includes providing the port having a portion of the one end (i.e. a portion of the first end of the port) that is external to the opening of the wall of the structure wherein a portion of the one end of the port (i.e. a portion of the first end of the port that is external to the structure) accommodates a first end of a tube for receiving a gas. In a preferred embodiment of this method, the method includes providing one or more sensors located within the sealed inner chamber for monitoring the pressure of the gas within the sealed inner chamber. More preferably, the method includes mounting one or more of the sensors to an interior portion of the wall of the inner chamber for monitoring the pressure of the gas within the sealed inner chamber. The sensors transmit data to a computer processor concerning the pressure within the sealed inner chamber. In a most preferred embodiment of the method of making an article of manufacture, the method, as described herein, further includes providing the computer processor for receiving data transmitted from one or more of the sensors to the computer processor, and providing the computer processor with a computer interface (link), wherein the computer processor's interface is linked to a compressor or gas storage cylinder and the valve of the port, wherein the compressor or gas storage cylinder is in communication with a first end of a tube and wherein a second end of the tube is in communication with a portion of at least the one end of the port (i.e. a portion of the first end of the port), and wherein the computer processor adjusts or maintains the pressure at a desired level within the bladder of the inner chamber by activation of the compressor (having the gas) or the gas storage cylinder (having the gas) sending the gas (under a positive or neutral pressure of about one atmosphere (1 atm)) through the tube into the one end of the port (i.e. the first end of the port) and through the valve of the port when the valve is in an open position wherein the valve is activated in either an open or closed position by the computer processor allowing for the gas to flow from the second end of the tube through the open valve of the port into the sealed bladder of the sealed inner chamber. This method optionally includes providing one or more sensors located within the sealed inner chamber and one or more sensors located within the sealed bladder for monitoring the pressure of the sealed inner chamber, the sealed bladder, or the inner chamber and the sealed bladder.

Other embodiments of this invention provide wherein the article of manufacture of this invention include for example but are not limited to one or more selected articles selected from the group consisting of an automobile, truck, industrial equipment, rail car, boat, aircraft, bicycle, unicycle, tricycle, device, frame, construction component, electronic component, packaging, and weapon.

The present invention solves or reduces the problem of weight to strength ratio, relative to a given structure's (A) structure-cost to targeted safety performance ratio, and/or (B) energy efficiency/usage to targeted performance ratio, and/or (C) structure-cost to targeted power performance ratio.

Then present invention solves or reduces the problem, of the current technological limits in some cases related to relative cost of options, of reducing weight of a given structure related to engineered strength specification requirements. Use of the present invention to lower-weight to given-performance ratio advantages could be achieved in areas (delete: "other than vehicles"), for example, but not limited to:

Structure problems related to vehicles (not limited to only: cars, trucks, airplanes, boats, etc.), is that stronger, more cost effective structures to meet government mandated regulations/standards for energy-usage per given unit, and/or safety (examples not limited to: (1) miles per gallon i.e.: mpg, (2) crash test standards, and (3) performance specifications;

Structure problems, not limited to buildings, vehicles, portable electronic devices, shipping packaging, shipping containers, sports equipment (examples: bicycles, golf clubs, golf balls, baseball bats, etc.) etc. to name a few, have the problem that they need additional raw materials to support their own unloaded weight plus the additional raw materials to meet the loaded weight to strength ratios. Lighter structures need less material to deal just with the design aspects of the unloaded structure itself, plus less material to meet the same loaded requirements; and Shipping problems related to cost of current structures and/or components of a given weight to strength ratio, would benefit from a shipping cost perspective of both shipping carriers and their customers if said structure and/or components could have a relatively-lower-weight to strength ratio per unit which would also further increase desired energy usage/cost efficiencies of shipping carriers.

Traditionally, increasing the amount of materials to increase strength results in also needing more material just to support the extra material needed for original strength goals. Use of the present invention provides, for example but not limited to, an improved vehicle design having a lower weight and lower manufacturing cost, while achieving improved safety, fuel mileage, performance, and strength standards.

DETAILED DESCRIPTION OF THE INVENTION

As used herein the terms "high pressure" or "positive pressure" refer to a pressure of greater than one atmosphere (1 atm), and preferably from greater than one atmosphere of pressure to greater than twenty atmosphere of pressure (20 atm) and up to and including three hundred atmosphere of pressure (300 atm). The term "neutral pressure" refers to a pressure of from about zero (0) atmosphere to about 1 atmosphere (1 atm).

Figure 21:
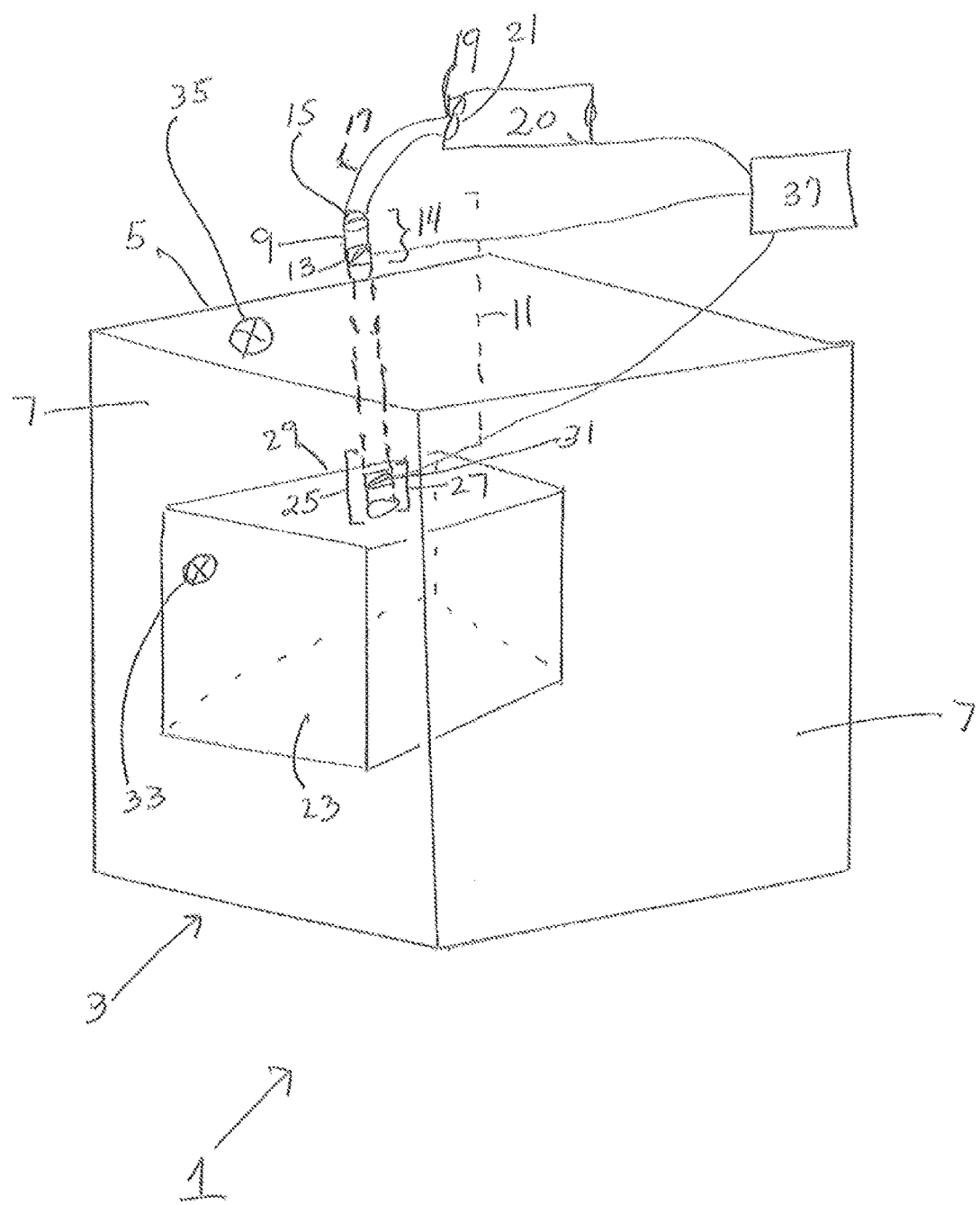
FIG. 21 shows a preferred embodiment of the article of manufacture of the present invention.

As shown in FIG. 21, the present invention provides an article of manufacture (identified by reference numeral "1", FIG. 21) having an improved weight to strength ratio comprising a structure (3) having at least one wall (5) forming a sealed inner chamber (7) and a gas (not shown in FIG. 21) that is located within the sealed inner chamber (7) for improving the weight to strength ratio of the structure (3). Preferably, this sealed inner chamber (7) has a gas in the inner chamber (7) under pressure. More preferably, this article of manufacture includes wherein the pressure of the sealed inner chamber (7) is either a positive pressure or a neutral pressure of about 1 atmosphere. In a most preferably embodiment of this invention, the article of manufacture (1), as described herein, includes wherein the sealed inner chamber (7) contains at least one port (9) wherein the port (9) has one end (11) that extends through at least one opening (not shown in FIG. 21) of at least one wall (5) that forms the sealed inner chamber (7) wherein the port (9) has a valve (13) that allows for the addition of gas into the inner chamber (7) or allows for the escape of gas out of the inner chamber (7), and wherein the port (9) is in sealed engagement with the opening (not shown in FIG. 21) located within at least one wall (5) of the structure (3). In another embodiment of this invention, as described herein, the article of manufacture (1) includes wherein the port (9) has one end (14) (i.e. a first end) that is external to the wall (5) of the structure (3) wherein the one end (14) of the port (9) accommodates a first end (15) of a tube (17) that is in sealed engagement with the one end (14) of the port (9), and wherein the tube (17) has a second end (19), wherein the second end (19) of the tube (17) accommodates the outlet (21) of a compressor or gas storage cylinder (having a gas, not shown) (20) and wherein the outlet (21) of the compressor or gas storage cylinder (20) is in sealed engagement with the second end (19) of the tube (17), the compressor or gas storage cylinder (20) supplying gas under pressure through the tube (17) and from the tube (17) into the port (9) and through the valve (13) of the port (9) when the valve (13) is in an open position, and into the inner chamber (7).

As set forth in FIG. 21, another embodiment of the article of manufacture of the present invention is shown, as described herein, the article of manufacture (1) has a sealed bladder (23) located within the sealed inner chamber (7), and wherein the sealed bladder (23) contains a gas (not shown in FIG. 21). Preferably, the article of manufacture (1), as described herein, has the sealed bladder (23) with the gas under pressure. The pressure of the sealed bladder (23) is either a positive pressure or a neutral pressure of about 1 atmosphere. In a most preferred embodiment of this invention, the article of manufacture of claim, as described herein, has the sealed bladder (23) having at least a portion of a second end (25) of port (9) that extends through at least one opening (not shown in FIG. 21) of a wall (29) of the sealed bladder (23) and through at least a portion of the internal volume space of the sealed inner chamber (7) wherein the second end (25) of port (9) (which may optionally have at least one valve (31)), the valve(s) 13 (and 31) allow(s) for the addition of gas into the sealed bladder (23) or allows for the escape of gas out of the sealed bladder (23), and wherein the port (9) is in sealed engagement with the opening of the wall (29) of the sealed bladder (23), or with the opening of the wall (5) of the sealed inner chamber (7), or with the opening of the wall (29) of the sealed bladder (23) and the opening of the wall (5) of the sealed inner chamber (7). Reference numeral 27 of FIG. 21 shows that portion of the second end (25) of port 9 that is in sealed engagement with the wall (29) of sealed bladder (23). Reference numeral 11 of FIG. 21 shows the portion of the port (9) that is external to the sealed bladder (23).

Another embodiment of this invention, provides an article of manufacture, as described herein, wherein the article of manufacture (1) further includes wherein the one end (14) of the port (9) extends through the opening (not shown in FIG. 21) in the wall (5) of the inner chamber (7), wherein the one end (14) of the port (9) accommodates a first end (15) of a tube (17) and wherein the first end (15) of the tube (17) is in sealed engagement with the one end (14) of the port (9), and wherein the tube (17) has a second end (19), wherein the second end (19) of the tube (17) accommodates the outlet (21) of a compressor or gas storage cylinder (20) and wherein the outlet (21) of the compressor or gas storage cylinder (20) is in sealed engagement with the second end (19) of the tube (17), and wherein the compressor or gas storage cylinder (20) supplies a gas under pressure through the tube (17) into the port (9) and through at least one valve (13), (31) of the port (9) when the valve(s) (13), (31) is/are in an open position, and into the sealed bladder (23).

As shown in FIG. 21, another embodiment of this invention provides an article of manufacture, as described herein, that includes one or more sensors (35) located within the sealed inner chamber (7) for monitoring the pressure of the gas within the sealed inner chamber (7). Preferably, one or more sensors (33) are located within the sealed bladder (23) for monitoring the pressure within the sealed bladder (23). More preferably, the article of manufacture (1), as described herein, includes wherein one or more sensors (33) are located within the sealed bladder (23) for monitoring the pressure within the sealed bladder (23) and wherein one or more sensors (35) are located within the sealed inner chamber (7) for monitoring the pressure of the sealed inner chamber.

As shown in FIG. 21, yet another embodiment of this invention provides an article of manufacture (1), as described herein, including a computer processor (37) for receiving data transmitted from one or more sensors (33, 35) located within the sealed bladder (23), or sealed inner chamber (7), or a combination of sensors (33,35) located with the sealed inner chamber (7) and the sealed bladder (23), to the computer processor (37, wherein the computer processor is interfaced (linked to) with the compressor or the gas storage cylinder (20) and the valve(s) (13,31) of the port (9), wherein the computer processor (37) adjusts or maintains the pressure at a desired level within the inner chamber (7) and the sealed bladder (23) by activation of the compressor or the gas storage cylinder (20) and the opening and closing of the valve(s) (13,31) of the port (9).

Another embodiment of this invention provides for an article of manufacture having an improved weight to strength ratio comprising a structure having at least one wall forming a sealed inner chamber, and a bladder that is in a deflated position located within the sealed inner chamber, wherein the deflated bladder has an inflation system that produces a gas to inflate the deflated bladder upon receiving a signal from a sensor, wherein the sensor is in communication with the deflated bladder, and wherein the sensor is located either within the structure or is located external to the structure, and wherein the sensor is optionally in communication with a computer processor. Preferably, the sensor is located either externally of the sealed inner chamber or within the sealed inner chamber. In a more preferred embodiment of this article of manufacture, as described herein, the inflation system comprises a solid propellant and an igniter. The igniter receives a signal from the sensor which causes the solid propellant to produce a gas wherein the gas inflates the deflated bladder to an inflated bladder under positive pressure or to a neutral pressure of one atmosphere. In a most preferred embodiment, the article of manufacture, as described, herein includes wherein the solid propellant is for example sodium azide (NaN3) and potassium nitrate (KNO3). In this most preferred embodiment of the article of manufacture, the igniter receives a signal from the sensor which causes the solid propellant of sodium azide (NaN3) and potassium nitrate (KNO3) to react to produce nitrogen gas wherein the nitrogen gas inflates the deflated bladder to an inflated bladder under pressure, and most preferably, a positive pressure or to a neutral pressure of one atmosphere (1 atm).

An article of manufacture is disclosed providing a structure having at least one wall forming a sealed inner chamber, and either (i) the sealed inner chamber is filled with a gas under pressure, or (ii) an inflated bladder filled with gas is located within the sealed inner chamber, or (iii) a bladder that is in a deflated position is located within the sealed inner chamber, and wherein the deflated bladder has an inflation system that produces a gas to inflate the deflated bladder upon receiving a signal from a sensor, wherein the sensor is optionally linked to a computer processor, or (iv) the sealed inner chamber has no additional added gas but is at 1 atm standard normal pressure, and has an inflation system that produces a gas, to pressurize inner chamber upon receiving a signal from a sensor, wherein the sensor is optionally linked to a computer processor.

Other embodiments of the present invention provide a method of making an article of manufacture having an improved weight to strength ratio comprising forming an article of manufacture having an improved weight to strength ratio comprising a structure having at least one wall that forms a sealed inner chamber, and inserting a gas into the inner chamber before it is sealed for making an article of manufacture having an improved weight to strength ratio. Preferably, this method includes wherein the sealed inner chamber has the gas in the inner chamber under pressure. More preferably, this method includes wherein the pressure of the sealed inner chamber having the gas is either a positive pressure or a neutral pressure of about 1 atmosphere. In a preferred embodiment of this invention, the method of making the article of manufacture, as described herein, further includes providing the sealed inner chamber with a port wherein the port has one end (i.e. a first end) that extends through at least one opening of at least one wall of the sealed inner chamber and wherein the port has a valve that allows for the addition of gas into the inner chamber or allows for the escape of gas out of the inner chamber when the valve is placed in an open position. This method preferably includes providing the port having a portion of the one end of the port be external to the wall of the structure wherein a portion of the one end of the port accommodates a first end of a tube for receiving a gas. This method preferably further includes providing one or more sensors located within the sealed inner chamber for monitoring the pressure of said gas within the sealed inner chamber. More preferably, this method includes mounting one or more of the sensors to an interior portion of the wall of the inner chamber for monitoring the pressure of the gas within the sealed inner chamber. Another embodiment of this method of making an article of manufacture includes providing the sensors for transmitting data to a computer processor concerning the pressure within the sealed inner chamber. In yet another more preferable embodiment of this invention, the method of making an article of manufacture includes providing a computer processor for receiving data transmitted from one or more of the sensors to the computer processor, and providing the computer processor with a computer interface wherein the computer interface is linked to a compressor or gas storage cylinder and the valve of the port, wherein the compressor or gas storage cylinder is in communication with a first end of a tube and wherein a second end of the tube is in communication with a portion of the one end (i.e. a portion of the first end of the port) of the port, and wherein the computer processor adjusts or maintains the pressure at a desired level within the inner chamber by activation of the compressor or gas storage cylinder sending the gas through the tube and activation of the valve from a closed position to an open position for allowing the gas to flow from the second end of the tube through the open valve of the port into the sealed inner chamber.

Another embodiment of this invention provides a method of making an article of manufacture having an improved weight to strength ratio comprising providing a structure having at least one wall for forming an inner chamber, inserting a sealed bladder within the inner chamber, and sealing the inner chamber of the structure having the bladder located within the inner chamber for forming a sealed inner chamber having the bladder for making an article of manufacture having an improved weight to strength ratio. In a further embodiment of this method of this invention, as described herein, the method includes placing a gas within the bladder prior to sealing the bladder and prior to inserting the sealed bladder into the inner chamber. Preferably, this method of making includes providing the gas under pressure in the sealed bladder. More preferably, this method of making includes providing the gas in either a positive pressure or a neutral pressure of about 1 atmosphere within the sealed bladder. In another embodiment of this method of making an article of manufacture, as described herein, the method further includes providing a port located within a wall of the sealed bladder wherein the port has one end (i.e. a first end) that extends through at least one opening of the wall of the sealed bladder and through at least one opening in at least one wall of the sealed inner chamber of the structure wherein the port has a valve that allows for the addition of gas into the sealed bladder or allows for the escape of gas out of the sealed bladder, and wherein the port is in sealed engagement with the opening of the wall of the sealed bladder and the opening of the wall of the inner chamber of the structure. This method further includes providing the port having a portion of the one end (i.e. a portion of the first end of the port) that is external to the opening of the wall of the structure wherein a portion of the one end of the port (i.e. a portion of the first end of the port that is external to the structure) accommodates a first end of a tube for receiving a gas. In a preferred embodiment of this method, the method includes providing one or more sensors located within the sealed inner chamber for monitoring the pressure of the gas within the sealed inner chamber. More preferably, the method includes mounting one or more of the sensors to an interior portion of the wall of the inner chamber for monitoring the pressure of the gas within the sealed inner chamber. The sensors transmit data to a computer processor concerning the pressure within the sealed inner chamber. In a most preferred embodiment of the method of making an article of manufacture, the method, as described herein, further includes providing the computer processor for receiving data transmitted from one or more of the sensors to the computer processor, and providing the computer processor with a computer interface (link), wherein the computer processor's interface is linked to a compressor or gas storage cylinder and the valve of the port, wherein the compressor or gas storage cylinder is in communication with a first end of a tube and wherein a second end of the tube is in communication with a portion of at least the one end of the port (i.e. a portion of the first end of the port), and wherein the computer processor adjusts or maintains the pressure at a desired level within the bladder of the inner chamber by activation of the compressor or gas storage cylinder (having the gas) sending the gas (under a positive or neutral pressure of about one atmosphere (1 atm)) through the tube into the one end of the port (i.e. the first end of the port) and through the valve of the port when the valve is in an open position wherein the valve is activated in either an open or closed position by the computer processor allowing for the gas to flow from the second end of the tube through the open valve of the port into the sealed bladder of the sealed inner chamber. This method optionally includes providing one or more sensors located within the sealed inner chamber and one or more sensors located within the sealed bladder for monitoring the pressure of the sealed inner chamber, the sealed bladder, or the inner chamber and the sealed bladder.

Other embodiments of this invention provide wherein the article of manufacture of this invention include for example but are not limited to one or more selected articles selected from the group consisting of an automobile, truck, industrial equipment, rail car, boat, aircraft, bicycle, unicycle, tricycle, device, frame, construction component, electronic component, packaging, and weapon.

As stated hereinabove, the present invention solves and/or reduces the problem of weight to strength ratio, relative to a given structure's (A) structure-cost to targeted safety performance ratio, and/or (B) energy efficiency/usage to targeted performance ratio, and/or (C) structure-cost to targeted power performance ratio. The present invention solves and/or reduces the problem, of the current technological limits in some cases related to relative cost of options, of reducing weight of a given structure related to engineered strength, and all other engineered specification requirements.

The present invention, for example, but not limited to, achieves a lower-weight to given-performance ratio and thus is advantageous in many areas of application in addition to use in vehicles and component parts of vehicles, such as:

Structure problems related to vehicles (not limited to only: cars, trucks, airplanes, boats, etc.), is that stronger, more cost effective structures to meet government mandated regulations/standards for energy-usage per given unit, and/or safety (examples not limited to: (1) miles per gallon i.e.: mpg, (2) crash test standards, and (3) performance standards;

Structure problems, not limited to buildings, vehicles, portable electronic devices, shipping packaging, shipping containers, sports equipment (examples: bicycles, golf clubs, golf balls, baseball bats, etc.) etc. to name a few, have the problem that they need additional raw materials to support their own unloaded weight plus the additional raw materials to meet the loaded weight to strength ratios. Lighter structures need less material to deal just with the design aspects of the unloaded structure itself, plus less material to meet the same loaded requirements; and Shipping problems related to cost of current structures and/or components of a given weight to strength ratio, would benefit from a shipping cost perspective of both shipping carriers and their customers if said structure and/or components could have a relatively-lower-weight to strength ratio per unit which would also further increase desired energy usage/cost efficiencies of shipping carriers. The present invention solves all of these aforementioned problems.

The present invention of the high pressure enhanced structure technology (hereinafter referred to as "HPEST" or the "HPEST system") drastically increases structure strength with almost zero increase in structure weight which results in a dramatically stronger, safer, more protective, structures that are more energy efficient than other existing technologies. Application of the present invention shall meet or exceed mandated safety standards with no additional energy and/or performance cost. In one embodiment of the present invention, HPEST provides a hollow sealed structure or hollow structure with a gas/air-bladder (for example, but not limited to, along balloon or rubber inner-tube, and/or as needed deployed "airbag" like explosive device which results in rapid expansion of gas/gases for pressurization.) occupying the hollow area, designed for a given application, is introduced to an engineered range of increased pressure internally with gaseous molecules (examples: air, nitrogen, mixed-gases, etc.) that the structure's strength characteristics are enhanced to mirror the strength characteristics of a much heavier, more raw material intensive structure, designed for the same given application. In a conventional automobile steering wheel "airbag" system, the bag itself is made of a thin, nylon fabric wherein a sensor device tells the bag to inflate. Inflation happens when a mechanical switch is flipped when there is a mass shift that closes an electrical contact, telling the sensors that a deployable event has occurred. In a conventional automobile "airbag system" the sensors receive information from an accelerometer built into a microchip. For example, an automobile's airbag's inflation system reacts sodium azide (NaN3) with potassium nitrate (KNO3) to produce nitrogen gas. Hot blasts of the nitrogen inflate the airbag. The inflation system uses a solid propellant inflater and an igniter (an "explosive system"). The automobile airbag system ignites a solid propellant which burns extremely rapidly to create a large volume of gas to inflate the bag. The bag then inflates from its storage position at up to 200 mph (322 kph). In an automobile airbag system, the gas then quickly dissipates through tiny holes in the bag, thus deflating the bag.

HPEST benefits also apply to nano structures (nano-HPEST-fabrication may require a positively pressurized environment specifically engineered for strength parameters, or negatively pressurized environment for engineered insulating-buffer (from heat, fields, pressure (sound, atmospheric, etc.), etc.) parameters (i.e. microchip, electrical, etc. applications).

The recited present invention differs from what currently exists. Conventional method to increase given structure's safety and/or strength is to add more material weight to achieve strength needed to meet government safety/efficiency standards. An advantage of HPEST is the same amount of material is made extremely stronger by pressurized gas within a sealed structure to meet or exceed standard with virtually no real weight increase which maintains better efficiencies/mileage in safer, stronger vehicles/structures at a lower manufacturing cost when compared to alternate methods.

This invention is an improvement on what currently exists. Conventional method to increase given structure's safety and/or strength is to add more material weight to achieve strength needed to meet government safety/efficiency standards. An Advantage of HPEST is the same amount of material is made extremely stronger by pressurized gas within a sealed structure to meet or exceed standard with virtually no real weight increase which maintains better efficiencies/mileage in safer, stronger vehicles/structures at a lower manufacturing cost when compared to alternate known in the art methods.

Existing known method to achieve safety standards by adding material lowers fuel mileage in a given vehicle, and doing so, results in higher weight, higher manufacturing cost, and fuel mileage cost increases. Using the articles of manufacture of the present invention, provides that a given vehicle design remains at a lower weight, lower manufacturing cost, while achieving the same or better safety, fuel mileage, performance, and strength standards.

The present invention (HPEST) may be utilized in countless market applications that would benefit from the advantages of higher strength, lower weight, energy savings (mandated by new laws), less material, and lower cost for a given structure. Market applications for HPEST may include for example, but are not limited to:

Automotive industry: Integrated into safety cages, side door safety beams, seat frames, accessory connecting rods, dash support structure, bumpers, wheels, drive shafts, boxed frames, axles, general suspension components, as the sealed interior of varied materials to enhance strength, etc.;

Aerospace: not limited to landing gear, general integrated flying machine structure assembly, prop and turbine blades, interior, etc.;

Construction: not limited to most structural systems in buildings, bridges, towers, tunnels, etc.;

Electronics: not limited to standard and nano general application benefits, lighter and better insulated-buffered (from heat, fields, pressure (sound, atmospheric, etc.) etc.) components, etc.; and Military: above applications plus not limited to temporary buildings, weapons, machines, vehicles etc.

Preferred Examples of HPEST of the Present Invention

1. A boxed sealed metal vehicle structure pressurized during assembly and permanently sealed, and/or pressurized via a valve for recharging pressure periodically over life of system, and/or onboard automatic compressor/s to add gas for strength, and/or rechargeable and/or replaceable airbag type rapid gasification devices within given structures to pressurize said structure just before predicted need for added structure strength such as a pending collision, and/or rechargeable and/or replaceable extremely high pressure gas storage devices, for example but not limited to, gas cylinders, within given structures and/or centralized to pressurize said structure/s just before predicted need for added structure strength such as a pending collision (example: much like automatic braking devices now used in some vehicles). All systems in this section and associated sections would require additional pressure tubing/hosing, gas compressors/processors located either centrally or integrated on/in each given pressurized structure unit which is a part of a greater structure unit/s etc. Type of gas used for pressurization in all related systems could be compressed "air" or separated elements for example but not limited to, nitrogen. A gas like nitrogen is preferred because nitrogen has larger molecule size that, for example when used in car tires it is less likely to leak out of given structure as quickly as "air". The type and identity of the gas is chosen dependent upon the engineered components and depending on needs of given system design.

2. A boxed sealed structure that has a sealed inserted gas-bladder to hold the pressurized gas within for added strength.

3. Relationship Between The Components:

Any of the methods for individual sub-systems described above and in examples 1 and 2, may be used independently or as needed within a given structure total system.

4. Various applications of HPEST:

To use the example of a car/truck the boxed pressurized structure of the present invention may be, but not limited to, structures like the cage around the passenger compartment, the structure rails from the passenger compartment to front & rear of a vehicle, then a left to right side of the vehicle boxed structure at the extreme front & rear of vehicle. Any areas that would require added strength in, but not limited to, for example, airplanes, boats, bikes, buildings, electronic devices, etc., HPEST could be applied also.

Pressure can be managed manually or with pressure sensors may need to be in each independent pressurized unit within a given vehicle to monitor required pressures to maintain required strength characteristics by either altering that pressure needed to be adjusted +/− or automatically adjusting +/− pressure. These parameters may be managed by independent dedicated computer systems and/or managed a vehicles central computer system as preprogrammed, remotely managed updated, and/or managed/updated by artificial intelligence, and/or managed/updated remotely as from a cloud system, cell phone application, home/manufacturers' computer for remote management examples.

5. Making the article of manufacture of the present invention

Using the example of a car/truck again normal joining of stamped/molded material except no holes and sealed completely so boxed areas can be pressurized. In the case of inserting a bladder to hold the pressurized gas provisions may need to allow inserting of said bladder then encasing within material to maximize strength, but separate bladder may not need to be entirely encapsulated depending on said bladder's specific strength specifications. Pressure may be monitored manually, or pressure monitoring sensors/devises may be installed in each separate pressurized structure to alert of changes in strength due to changes in pressure within each given structure subsystem. A central compressor or extremely high pressurized gas source would have to be connected to each separate sub-structure within total structure by tubing, hoses, etc., and/or same said systems would have to be independently attached to each individual substructure and/or structure and/or replaceable airbag type rapid gasification inflation devices within given structures to pressurize said structure to a structure specific engineered pressure just before predicted need for added structure strength such as a pending collision.

Sealed boxed areas are needed. Depending on how well pressurized gas can be maintained would set the need for methods to re-pressurize with additional gas as needed. If often, onboard compressor and needed plumbing to sealed boxed sections would be needed as described above.

Examples/model of a vehicle (car/truck) total system could be the entire vehicle, the unibody structure with sub-systems within the total unibody structure, the frame would be one of countless sub-systems of a body-on-frame model of an entire vehicle total system model. The frame could use HPEST technology in addition to HPEST utilized in the body sections unibody systems and sub-systems.

HPEST may be engineered into most articles of manufacture's structure design to increase structure strength to meet or exceed desired characteristics and/or government safety standards without much added material cost and without increasing fuel consumption.

Additionally: HPEST could be integrated into, but not limited to, furniture, cell phones, computers, shipping containers, protective clothing, sports equipment, ships, trains, airplanes, buildings, doors, windows, towers, bridges, tunnels, electrical transmission line cables, etc. structures to make these applications stronger and lighter. The present invention (HPEST) may be utilized in countless market applications that would benefit from the advantages of higher strength, lower weight, energy savings (mandated by new laws), less material, improved performance, and/or lower cost for a given structure. Market applications for HPEST may include, for example but are not limited to:

Automotive industry: integrated into safety cages, side door safety beams, seat frames, accessory connecting rods, dash support structure, bumpers, wheels, drive shafts, boxed frames, axles, general suspension components, as the sealed interior of varied materials to enhance strength etc.;

Aerospace: not limited to landing gear, general integrated flying machine structure assembly, prop and turbine blades, interior, etc.;

Construction: not limited to most structural systems in buildings, bridges, towers, tunnels, etc.;

Electronics: not limited to standard and nano general application benefits . . . lighter and better insulated-buffered (from heat, fields, pressure (sound, atmospheric, etc.) etc.) components, etc.; and Military: above applications plus not limited to temporary buildings, weapons, machines, vehicles etc.

6. Testing of the Present Invention (HPEST): Nonlinear Finite Element Structural of HPEST Under the Effect of Frontal Impact.

A. PURPOSE

Figure 1:
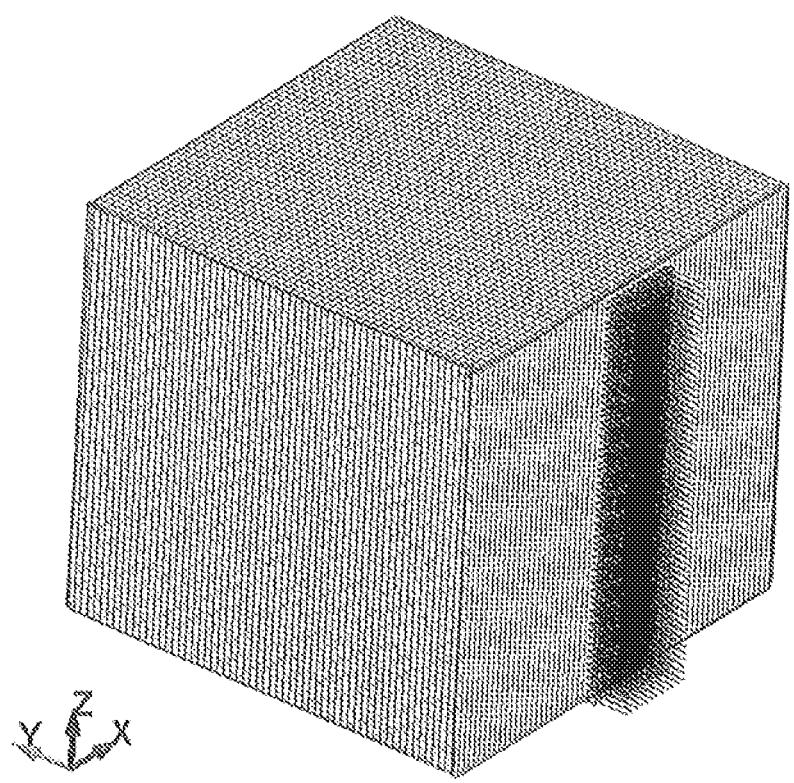
FIG. 1 describes finite element mesh of HPEST chamber of this invention and applied pressure.
Figure 2:
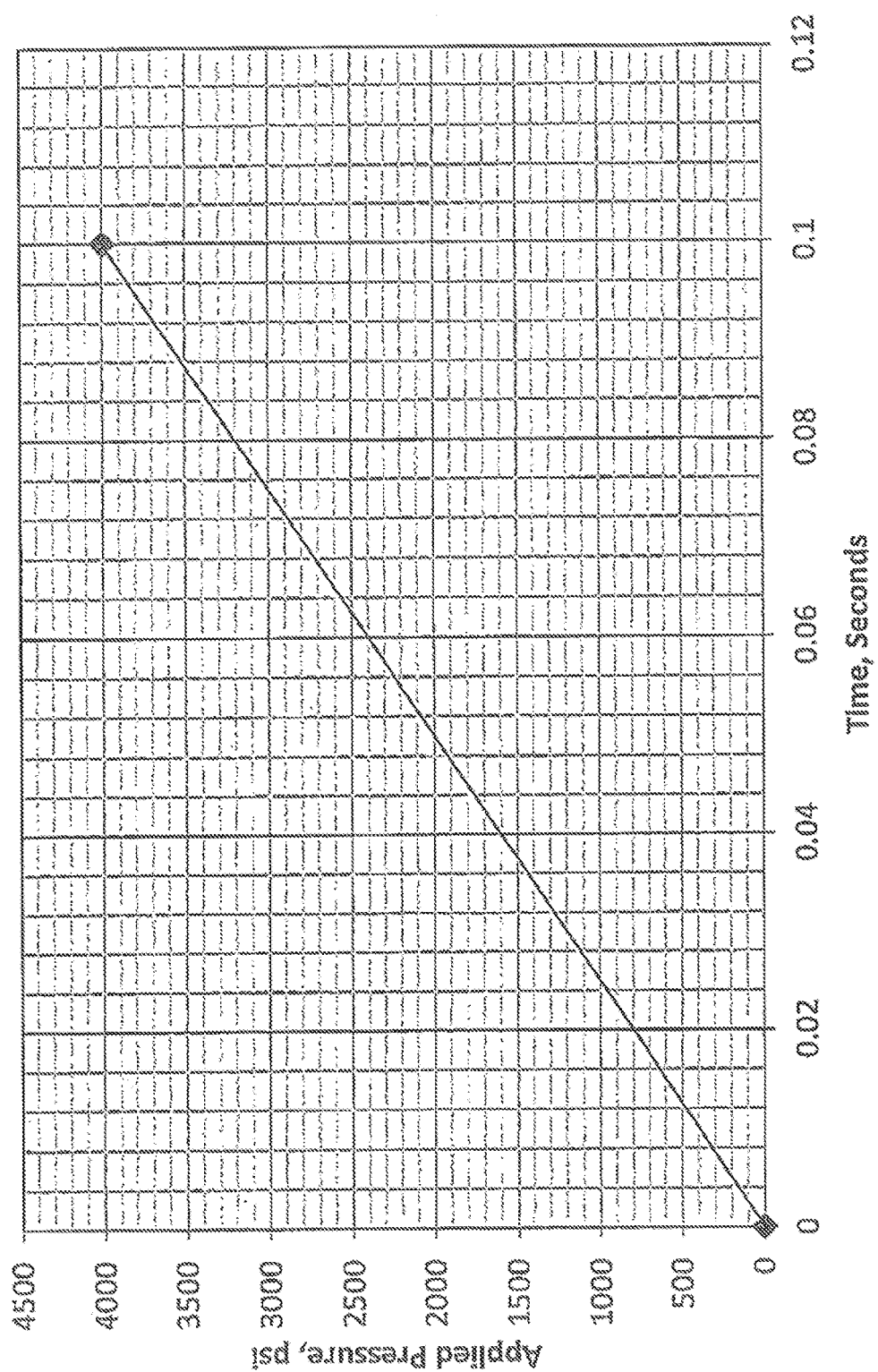
FIG. 2 describes pressure-time history.

The objective of this calculation is to determine the structural response of a closed steel chamber filled with pressurized air, thereafter will be called HPEST model, when subjected to frontal impact load. The impact loading was applied perpendicularly on a strip of the front face of the chamber whose width is 20 percent of the chamber width, while restraining the edges of the opposite face as illustrated in FIG. 1. The magnitude of the impact loading increased monotonically from zero until the model structurally failed as illustrated in FIG. 2. The scope of this calculation is to demonstrate the effect of the internal pressurized air on the magnitude of the failure load. FIG. 1 shows the finite element mesh of a HPEST structure of the present invention and applied pressure. Information regarding the physical and mechanical material properties of steel and air were obtained from existing literature, see References 1 and 2.

B. DEVELOPMENT OF A 3D NONLINEAR MODEL OF HPEST

Figure 3:
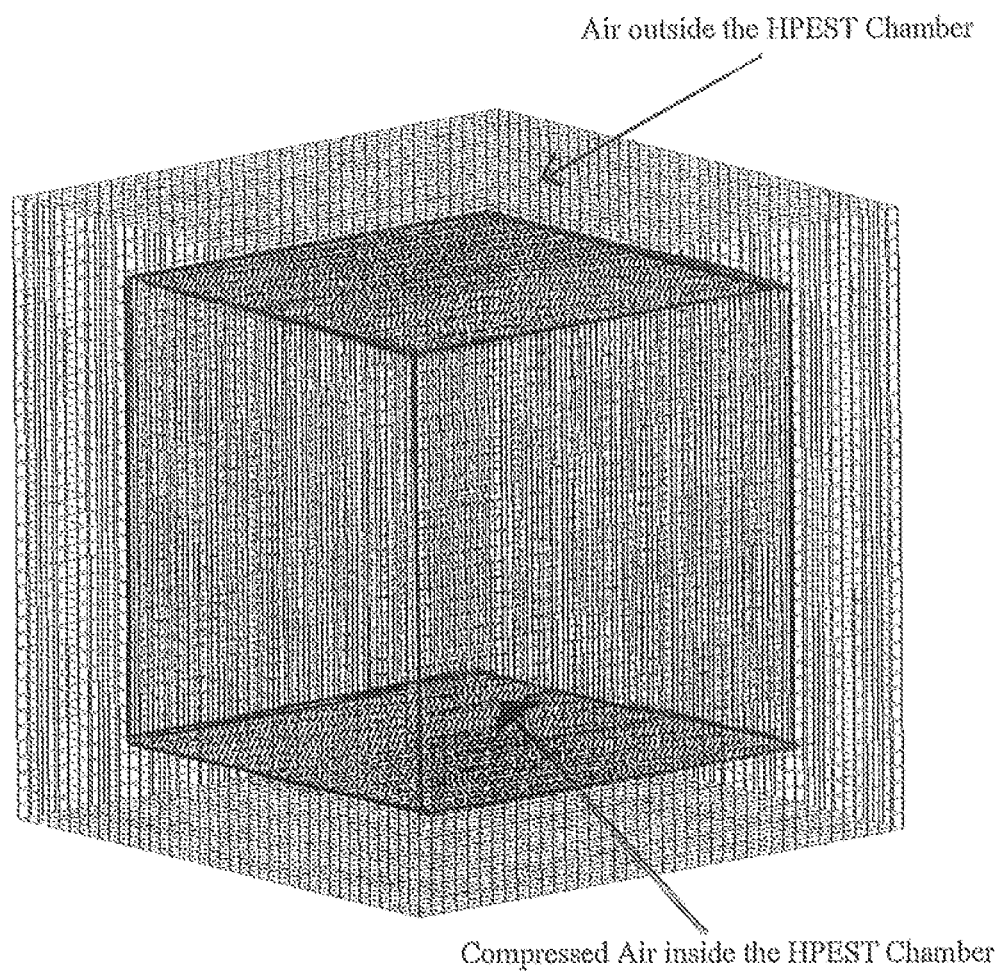
FIG. 3 describes finite element model of HPEST chamber of this invention and air.

A 3D nonlinear finite element model was developed for the HPEST chamber using LS-DYNA with an objective to demonstrate that any pressurized gas inside the chamber will absorb the impact energy and will allow the chamber to sustain higher impact loads. For this purpose, the chamber is assumed to be filled and surrounded with air. The dimensions of the chamber used in the model are 6 in×6 in×6 in. In order to demonstrate the effect of the pressurized gas inside the chamber, several finite element models were analyzed for different preset values of initial pressure of the air inside the chamber namely 0 atm, 1 atm (14.696 psi), 10 atm and 20 atm, while the pressure of the outside air was kept constant at 1 atm (one atmosphere). The HPEST mesh with the air inside and outside is shown in FIG. 3. The finite element model of the HPEST chamber consists of three main components: the chamber shell, the fluid (air) inside the chamber, and the air outside the chamber. The tank shell is subdivided into three components to represent the top, bottom, and side walls regions to facilitate visualization in post processing. The chamber sides are modeled using four-node Belytschko-Tsay shell elements. A fine mesh (0.10 inch) was used for the chamber to ensure accurate geometric representation. The shell has uniform thickness of 3/64 inch for all chamber sides. The total number of shell element used is 21,600. The constitutive model used for the steel is the "Elastic Plastic Kinematic Material Model" in LS-DYNA, also known as MAT_003 (see references 3, 4). The properties used in the model are listed in Table 1.

TABLE 1

Material Properties

| Material | Property | Value |
|---|---|---|
| Steel | Density | 7.324E−04 lb · s$^2$/in$^4$ |
| | Elastic Modulus | 0.300 |
| | Poisson's Ratio | 29,000 ksi |
| | Yield strength | 50 ksi |
| | Ultimate Strength | 63 ksi |
| | Strain to Failure | 0.19 |
| | Hardening Modulus | 79.670 ksi |
| Air | Density | 9.40E−08 lb · s$^2$/in$^4$ |
| | Dynamic Viscosity Coeffcient | 3.979E−06 psi · sec |

The fluid inside the chamber is discretized by means of eight-node solid hexahedron elements with an Arbitrary Lagrange-Eulerian (ALE) formulation (elform=11 in LS-DYNA notation). The total number of ALE solid elements used in this model is 64,000. In this formulation, the ALE mesh is directed to move in some prescribed manner as the solution progresses. The air surrounding the box was also considered, being modeled using the same elements as in the fluids inside the chamber. Modeling this air region is essential to allow the inside air to flow into it, deforming the walls of the structure. To achieve that, air meshes have to share the same nodes at their interfaces.

The physical effects of air are modeled using MAT_NULL and Linear Polynomial Equation of State (*EOS_LINEAR_POLYNOMIAL) are commonly used to represent the air. According to LS_DYNA Modeling Guide (5), typical input constants for air at sea level (initial pressure=1 atm) associated with these commands are as follows.

*MAT_NULL:
  Mass density, RO=0.94e-7 lbf-s$^2$/in$^4$
  All other parameters in *MAT_NULL should be set to zero or left blank.
*EOS_LINEAR_POLYNOMIAL:
  Unitless parameters $C_4$ and $C_5$ are set to 0.4.
  $C_0=C_1=C_2=C_3=C_6=0$.
  $V_0=1.0$
  $E_0$ (in units of stress)=initial pressure/C4=initial pressure/ 0.4. Thus, for an initial pressure of 1 atm, $E_0$=36.8 psi.

C. FLUID-STRUCTURE INTERACTION

As aforementioned, the air was modeled with ALE hexahedrons and the HPEST structure was modeled with Lagrangian shells. In such a model, the Lagrangian mesh does not share nodes with the ALE mesh. The two meshes interact via a coupling algorithm defined with the command *CONSTRAINED_LAGRANGE_IN_SOLID. This coupling serves to generate forces that resist penetration of the ALE material through the Lagrangian parts. This coupling is a key and complex aspect of ALE modeling. FIG. 3 shows a finite element model of HPEST ucture with sealed inner chamber having compressed air, and air positioned outside the HPEST chamber.

i. Results

Figure 4:
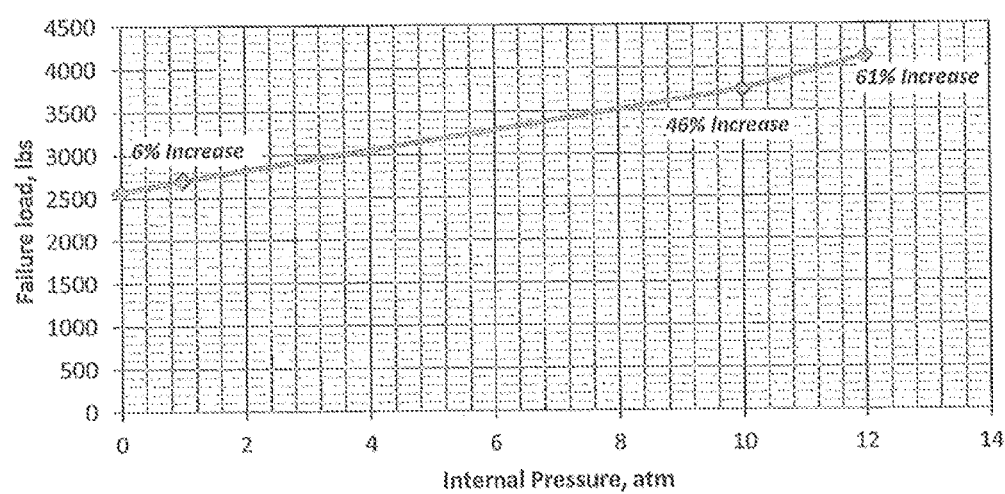
FIG. 4 describes relationship of failure load and air internal pressure.

The finite element models developed indicate that as the internal pressure of the air inside the HPEST inner chamber increases, the more the energy absorbed by the impact. FIG. 4 summarizes the relationship between the air internal pressure and the failure load. Failure load in this context is defined as the load at which the strain at any shell element reaches its maximum value of 0.19. FIG. 4 shows a 61 percent increase in the failure load as the internal pressure of the inside air increases from zero to 12 atm.

Figure 6:
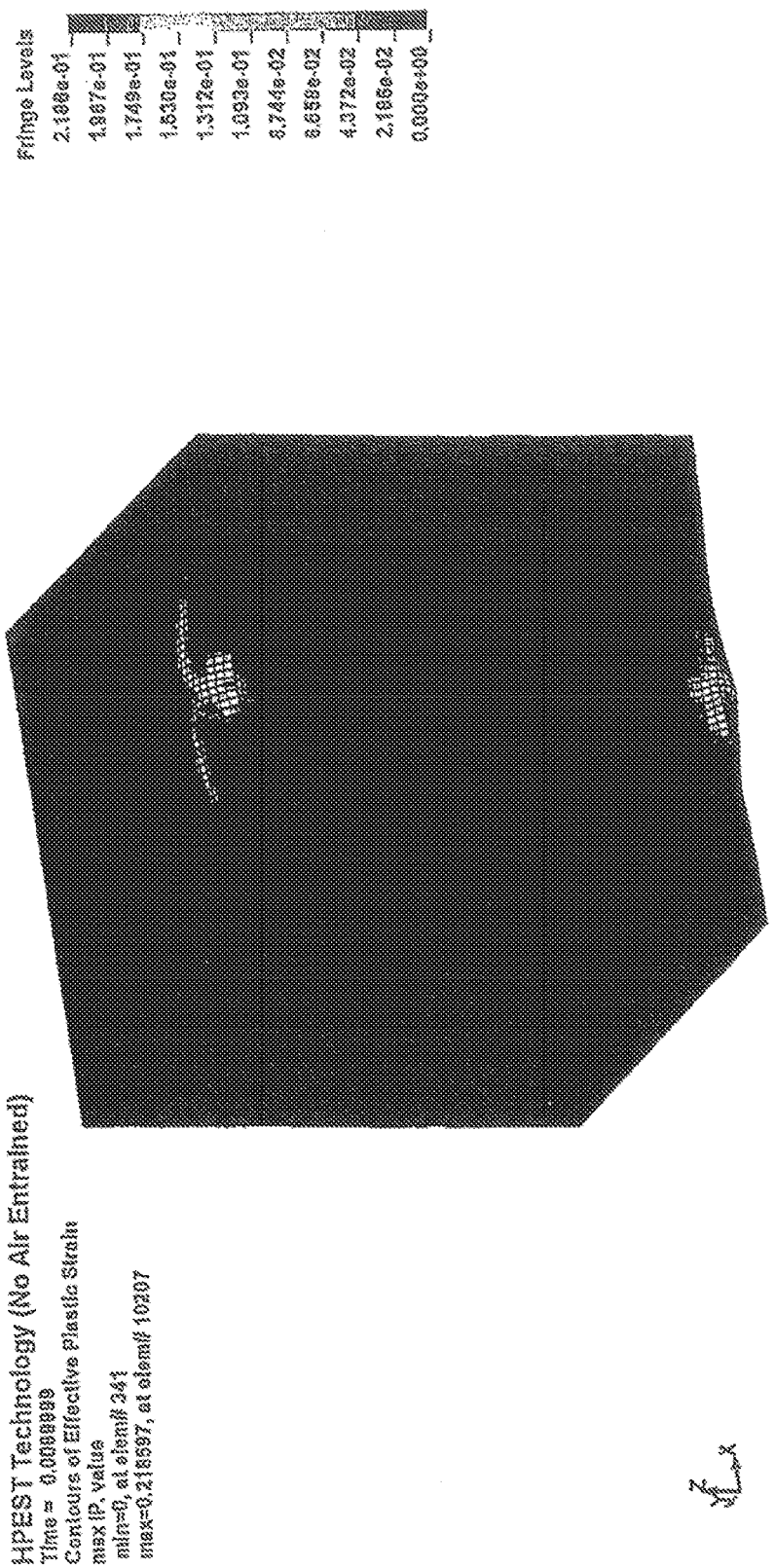
FIG. 6 describes effective plastic strain in HPEST chamber of this invention before failure (no entrained air).

Impulse is defined as is the integral of a force, F, over the time interval, t, for which it acts (6). This quantity is used to express the change in momentum during collision. FIG. 6 shows that increasing internal pressure to 12 atm results in 159 percent increase in the impulse (2.59 folds of the original impulse at no internal pressure). This is due to the fact that the pressurized air inside the HPEST chamber absorbs the energy and defers the high deformation until the sides reaches their failure strain before it starts to crash. In fact, the presence of the pressurized air inside the chamber absorbs the shock of the impact while the sides are strained until they reach failure by initiation of cracks. Then the collapse is further delayed as the air escapes through the cracked walls of the chamber till reaches final crush similar to that noticed in the case with no entrained air.

Figure 5:
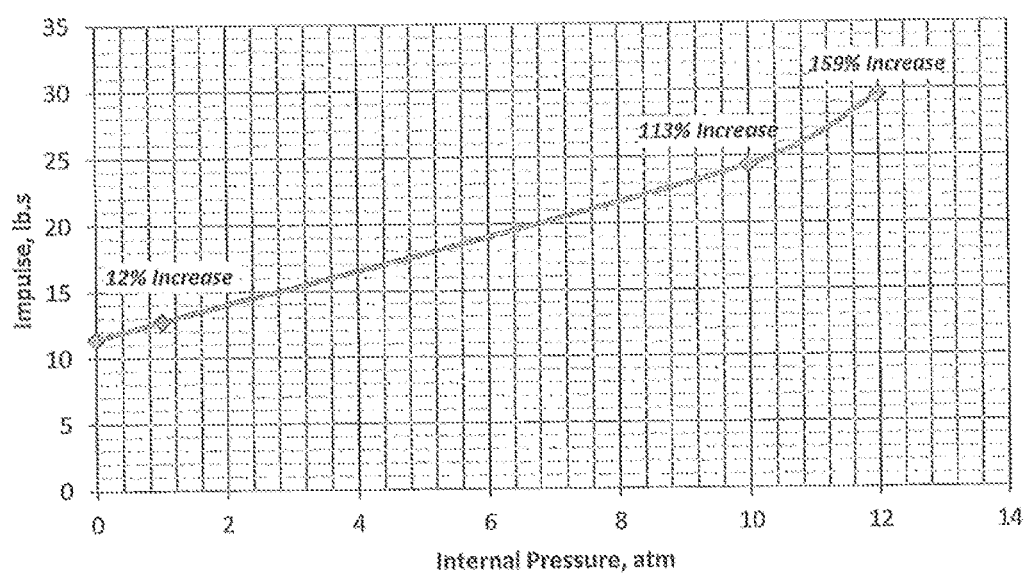
FIG. 5 describes relationship of impulse at failure and air internal pressure.
Figure 7:
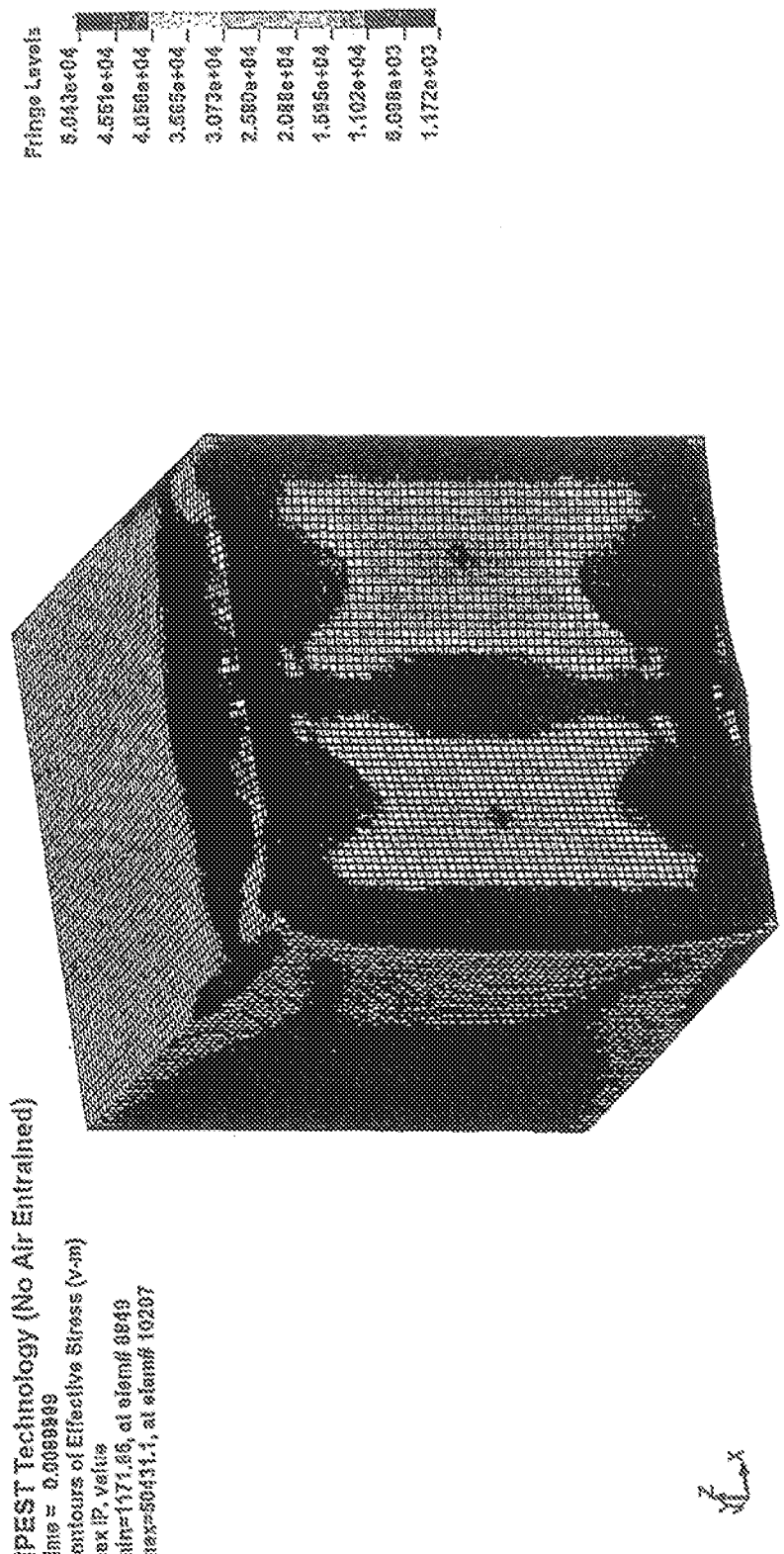
FIG. 7 describes Von Mises effective stress in HPEST chamber of this invention before failure (no entrained air).
Figure 8:
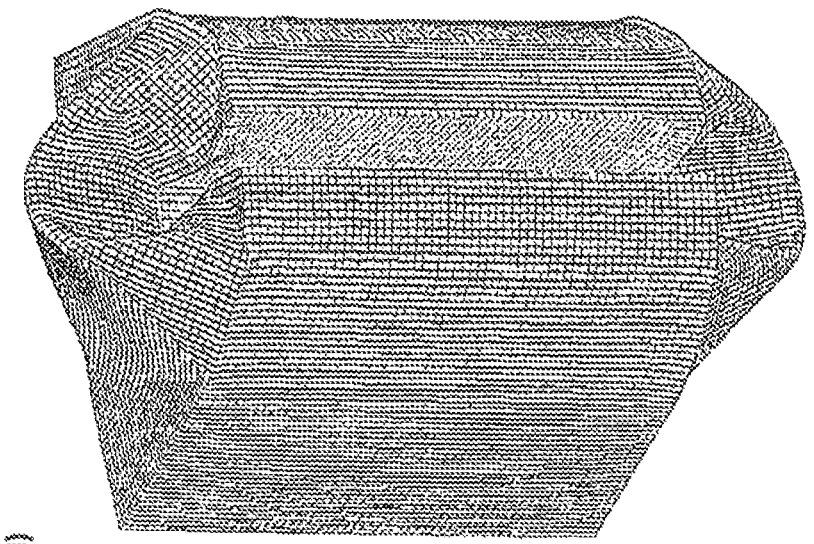
FIG. 8 describes full collapse of the HPEST chamber of this invention with no entrained air.
Figure 9:
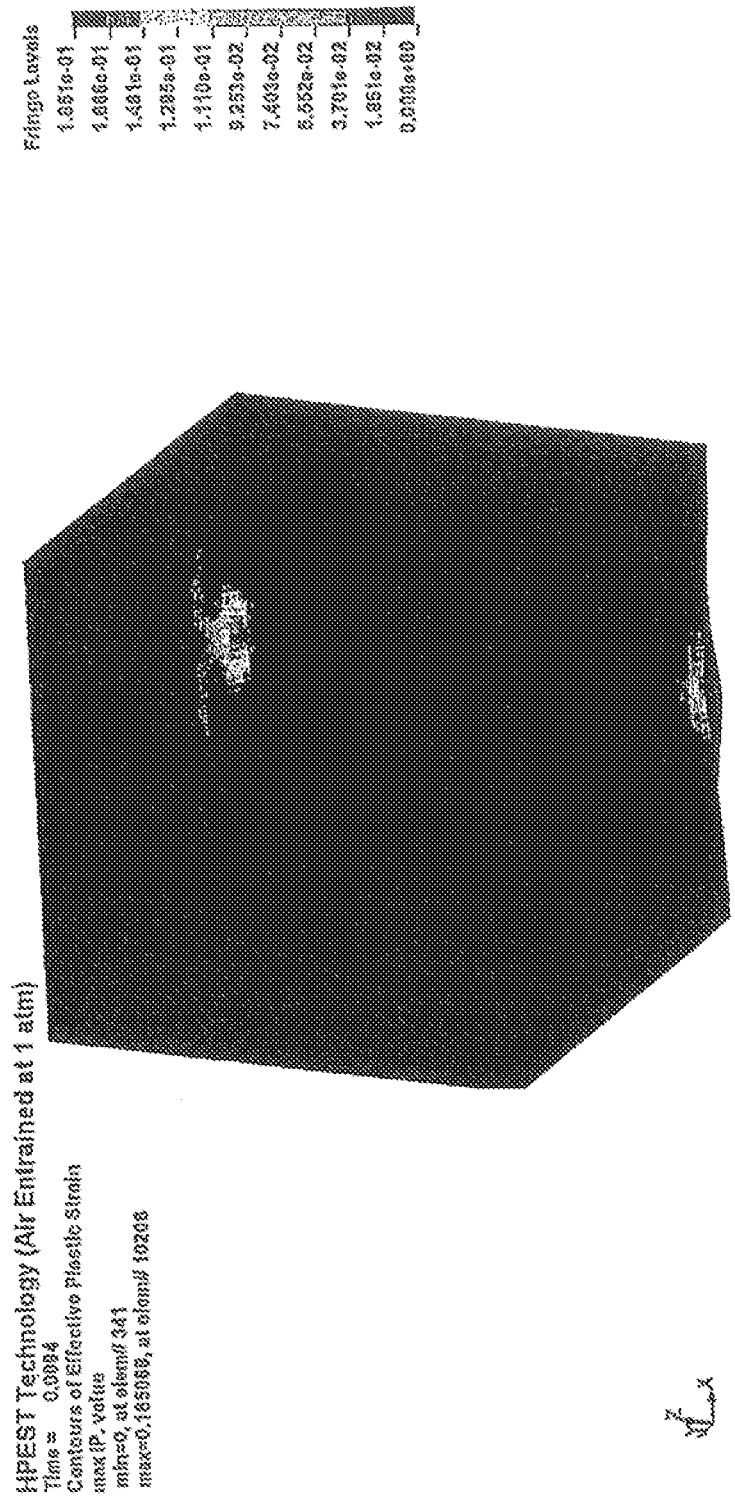
FIG. 9 describes effective plastic strain in HPEST chamber of this invention before failure (1 atm).
Figure 10:
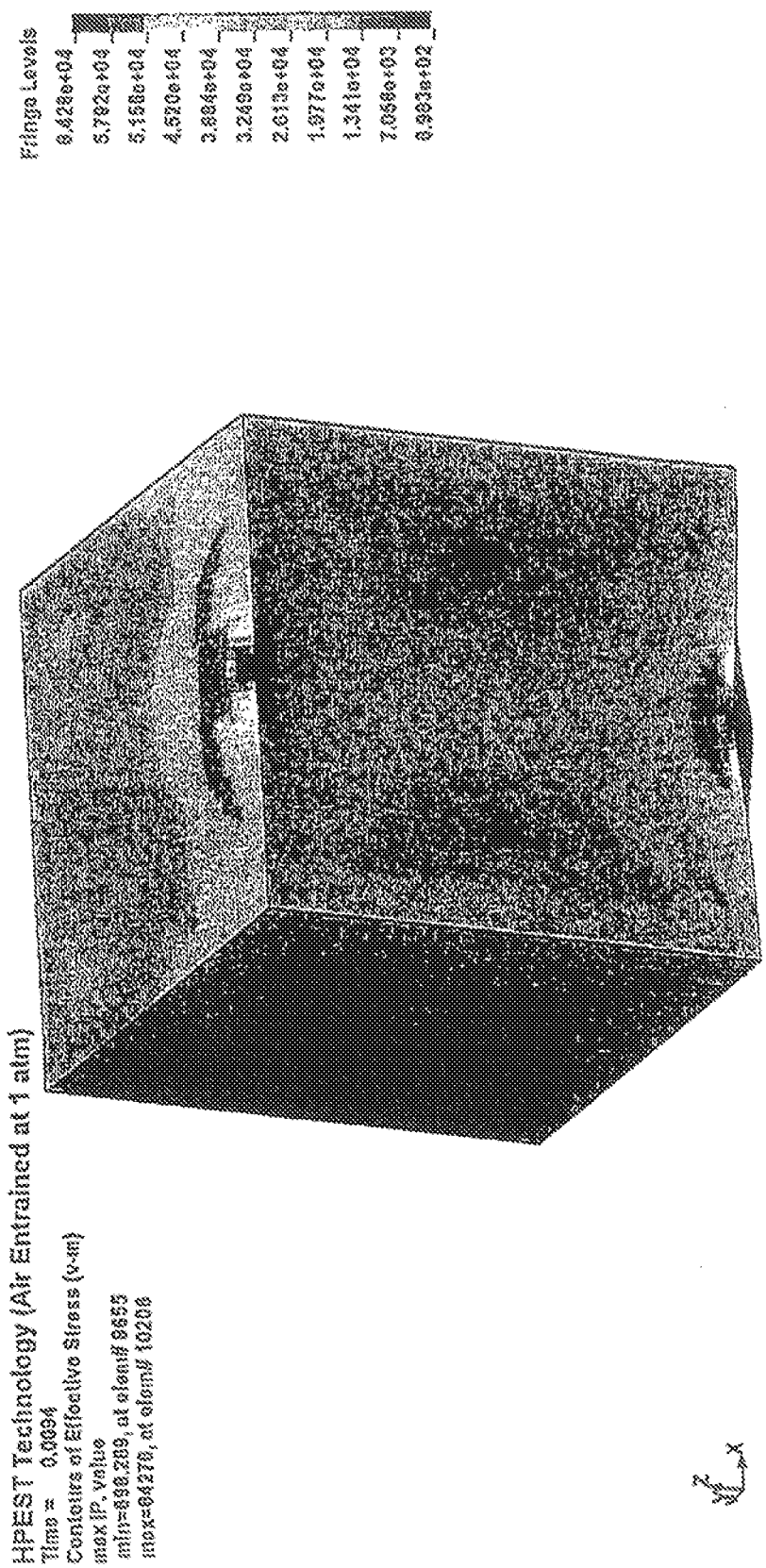
FIG. 10 describes Von Mises effective stress in HPEST chamber of this invention before failure (1 atm).
Figure 11:
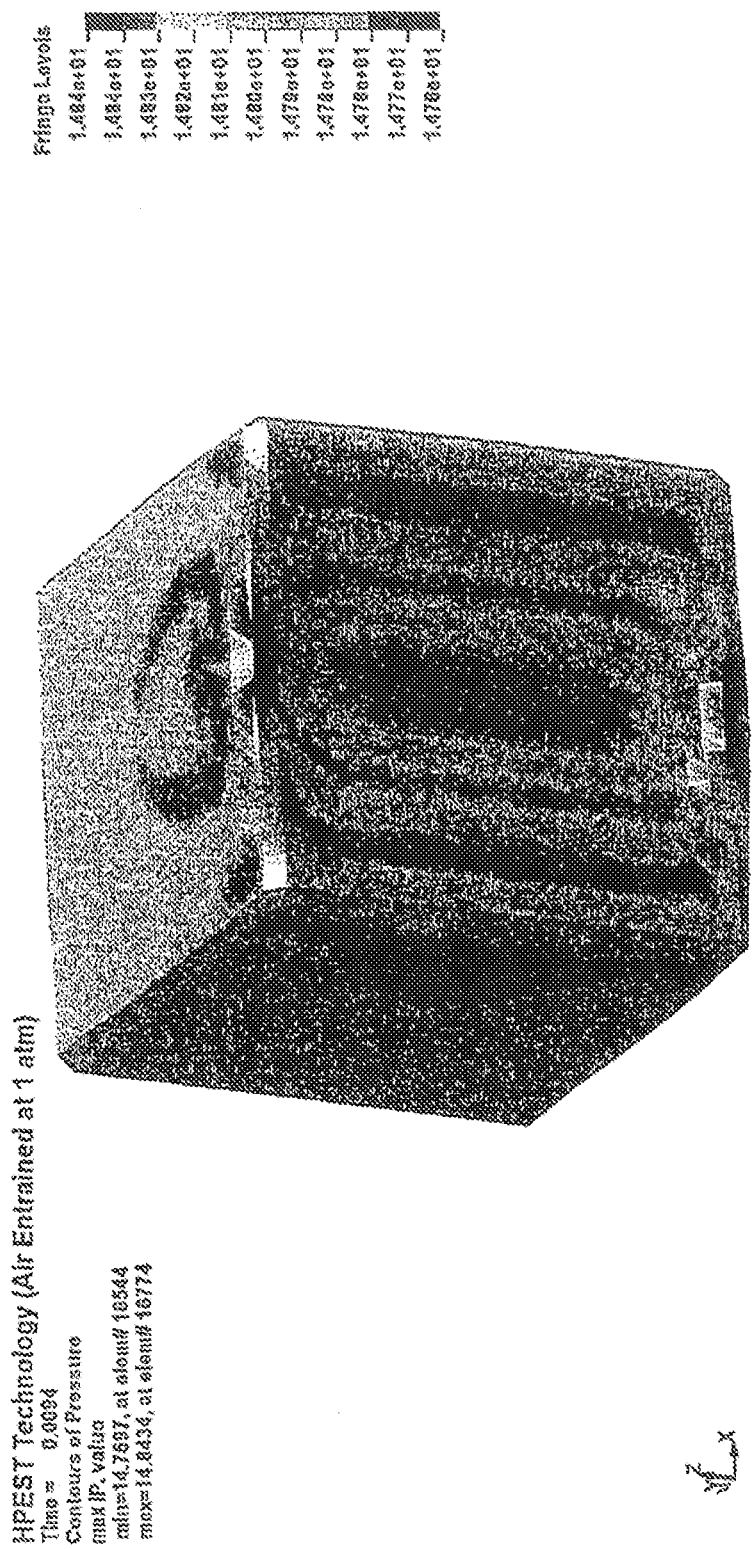
FIG. 11 describes internal pressure in air inside HPEST chamber of this invention (1 atm).
Figure 12:
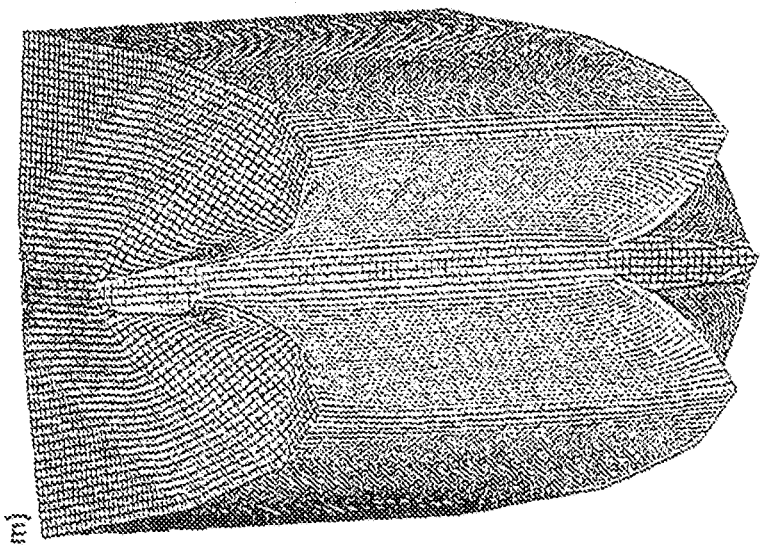
FIG. 12 describes failure of HPEST chamber of this invention at 1 atm internal pressure.
Figure 13:
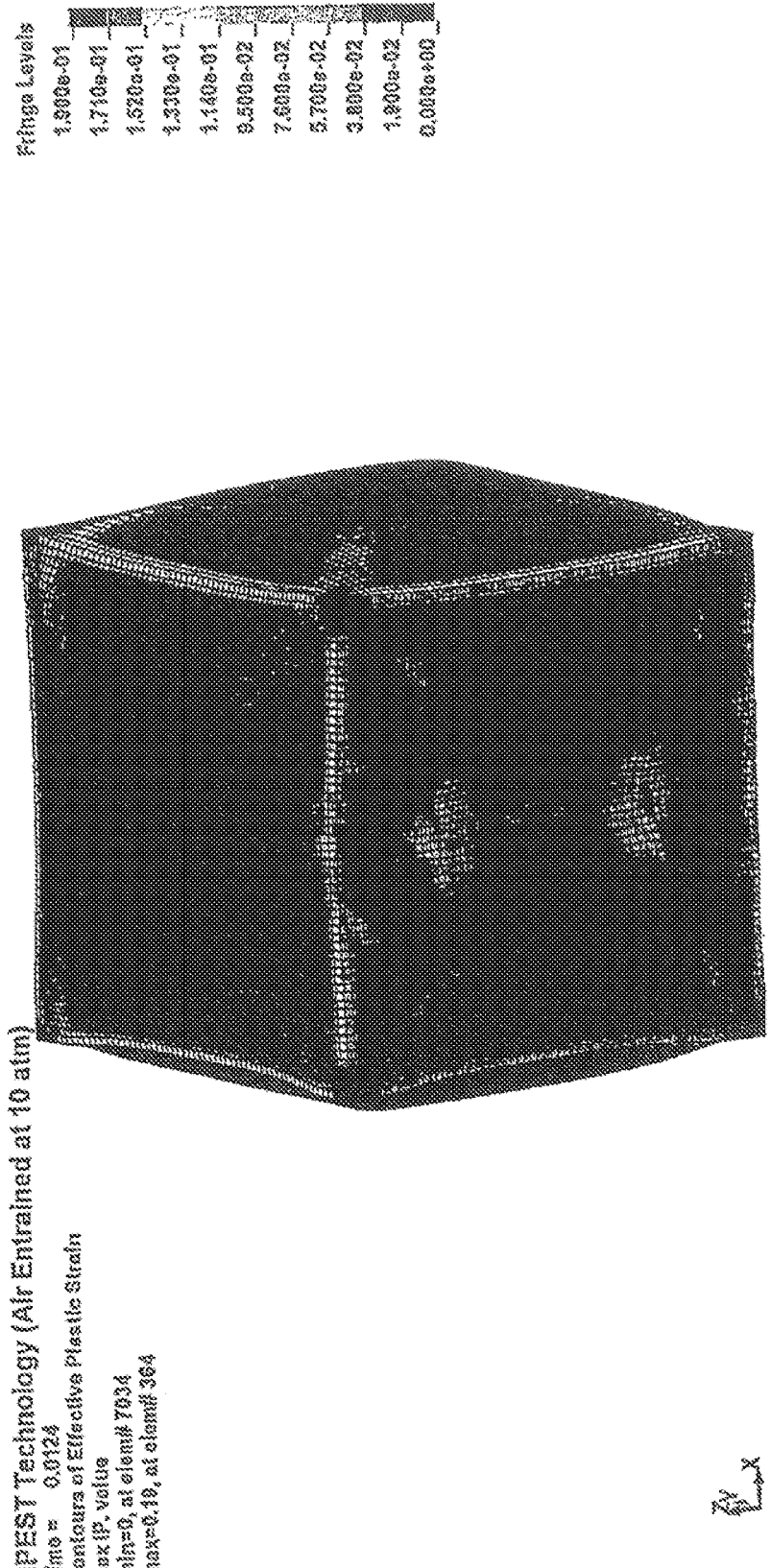
FIG. 13 describes plastic strain in HPEST chamber of this invention before failure (10 atm).
Figure 14:
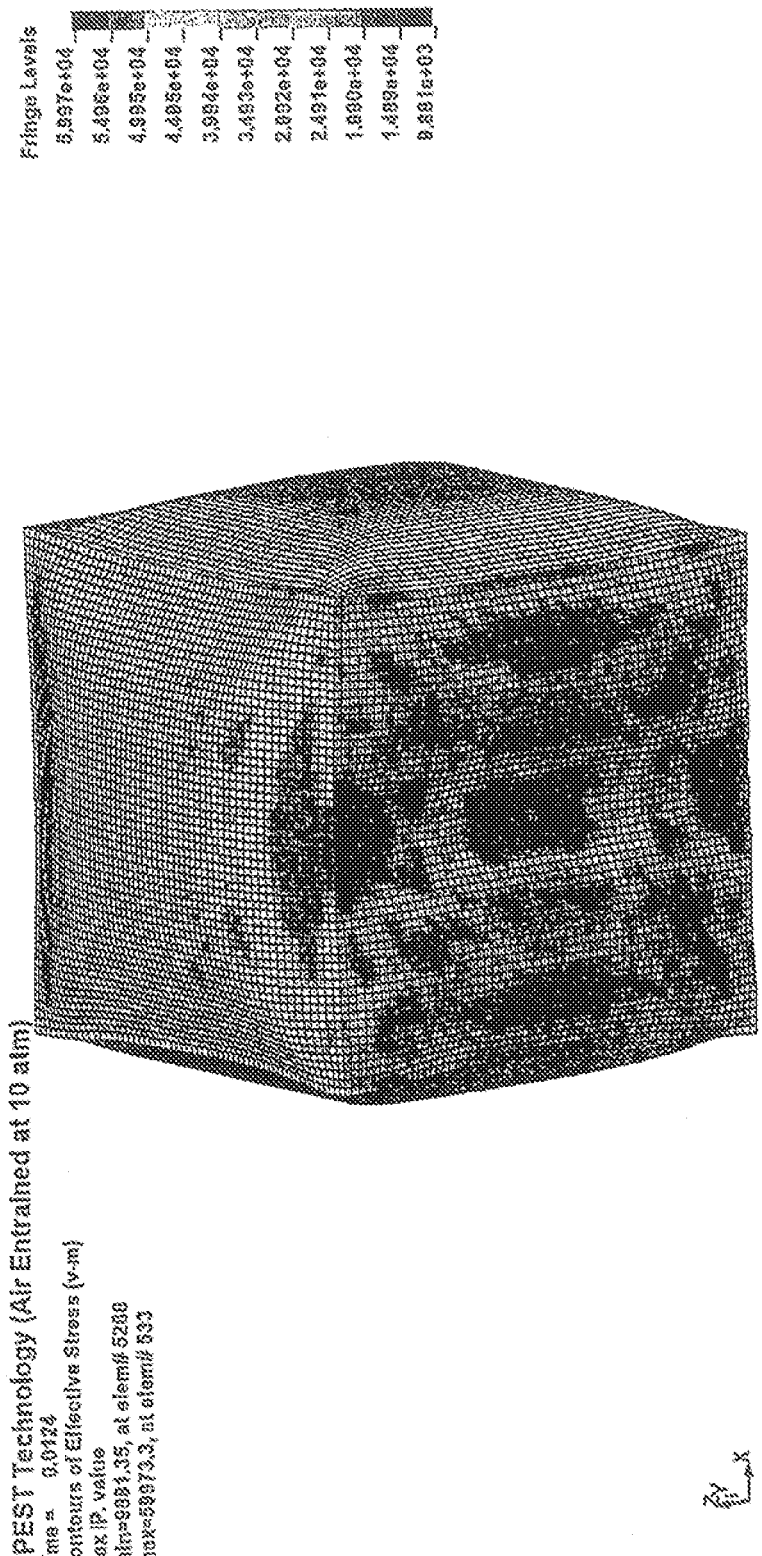
FIG. 14 describes Von Mises effective stress in HPEST chamber of this invention before failure (10 atm).
Figure 15:
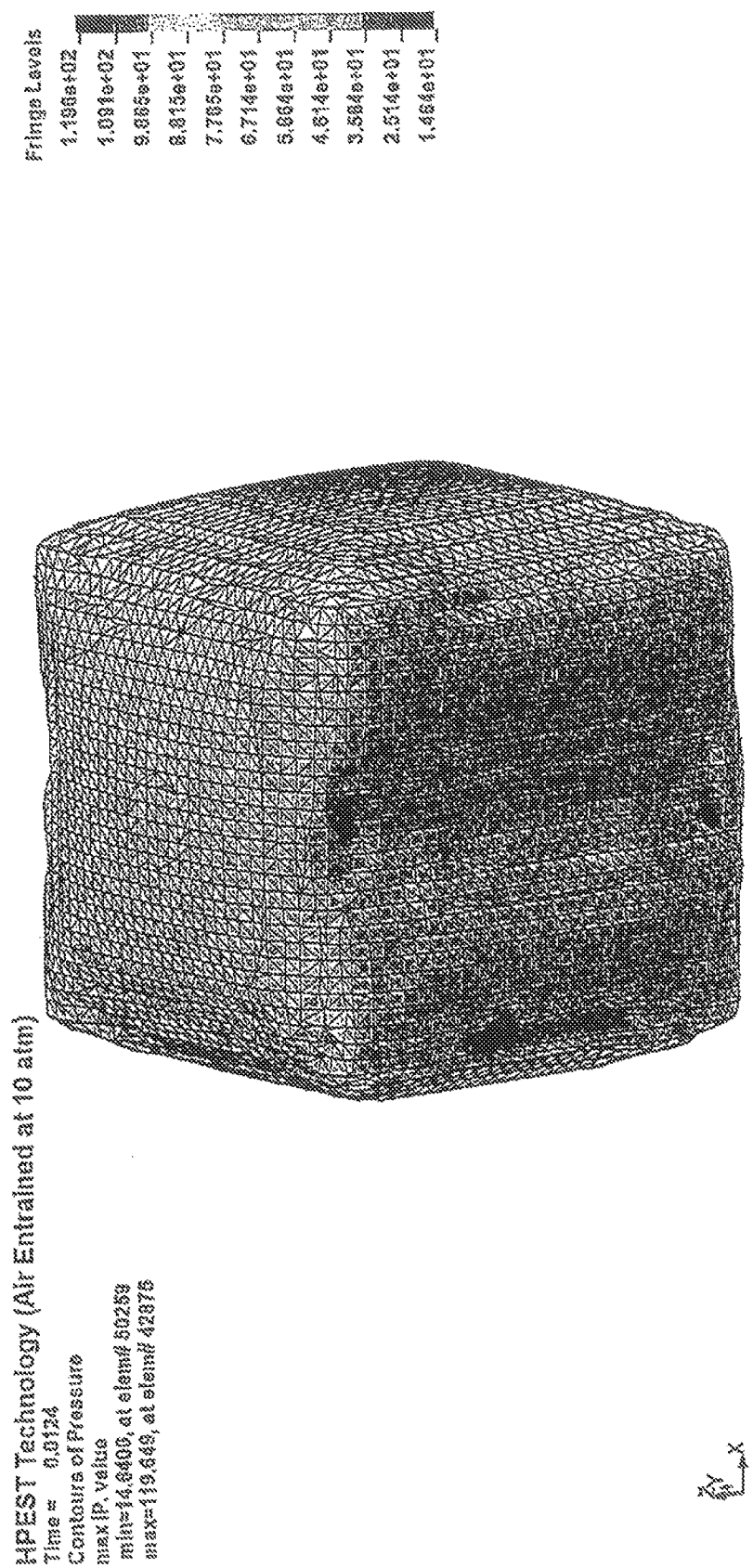
FIG. 15 describes internal pressure of air inside HPEST chamber of this invention before failure (10 atm).
Figure 16:
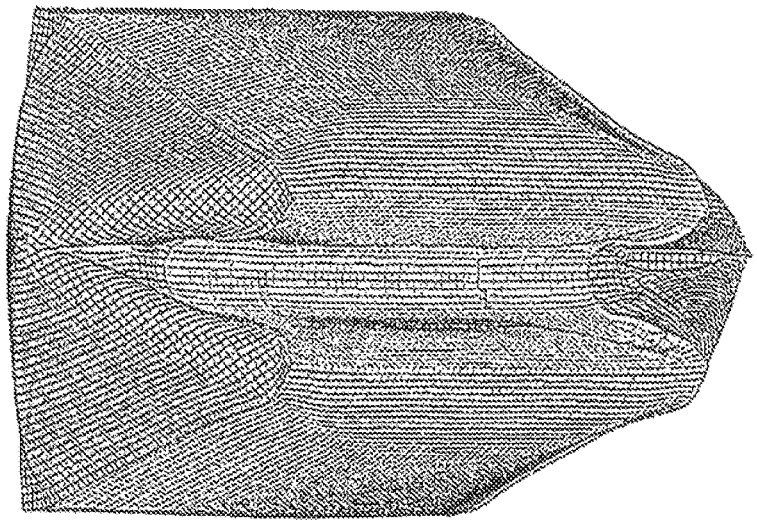
FIG. 16 describes failure of HPEST chamber of this invention at 10 atm internal pressure.
Figure 17:
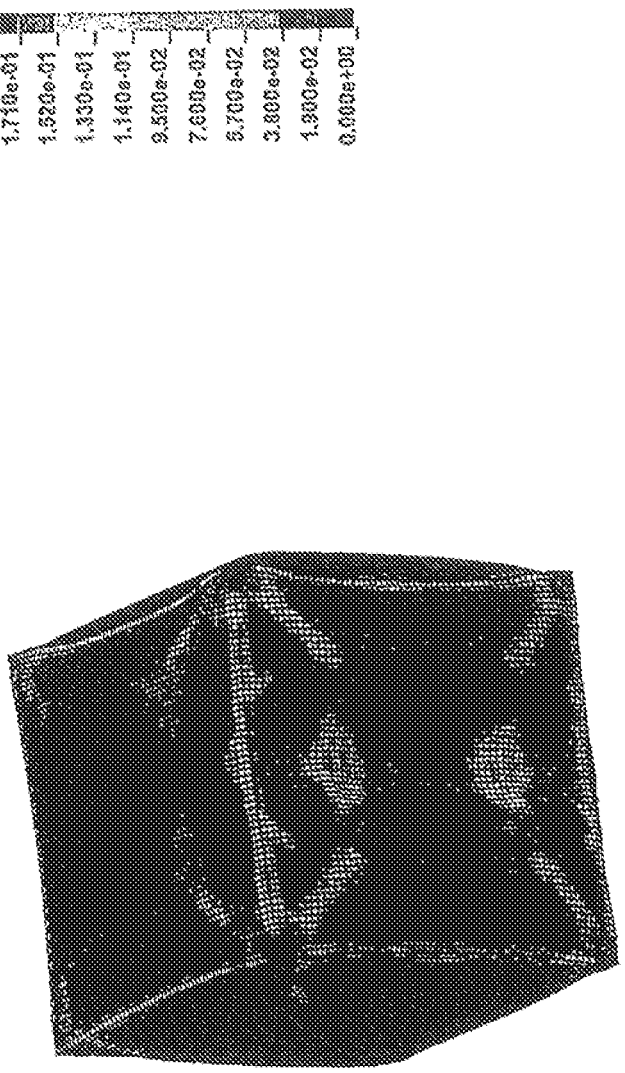
FIG. 17 describes plastic strain in HPEST chamber of this invention just before failure (12 atm).
Figure 18:
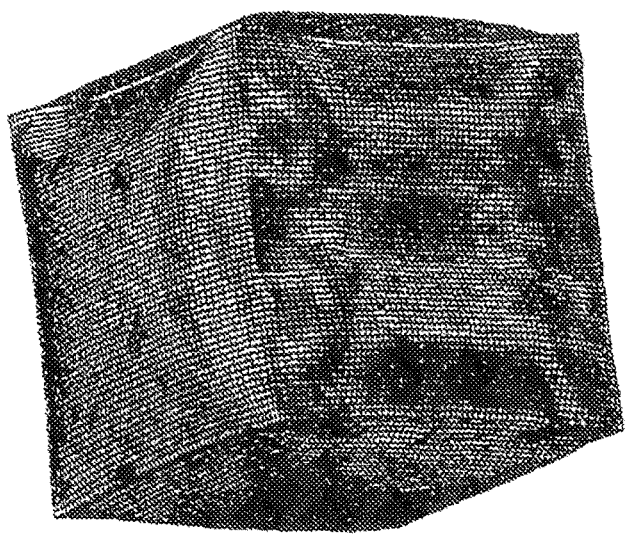
FIG. 18 describes Von Mises effective stress in HPEST chamber of this invention before failure (12 atm).
Figure 19:
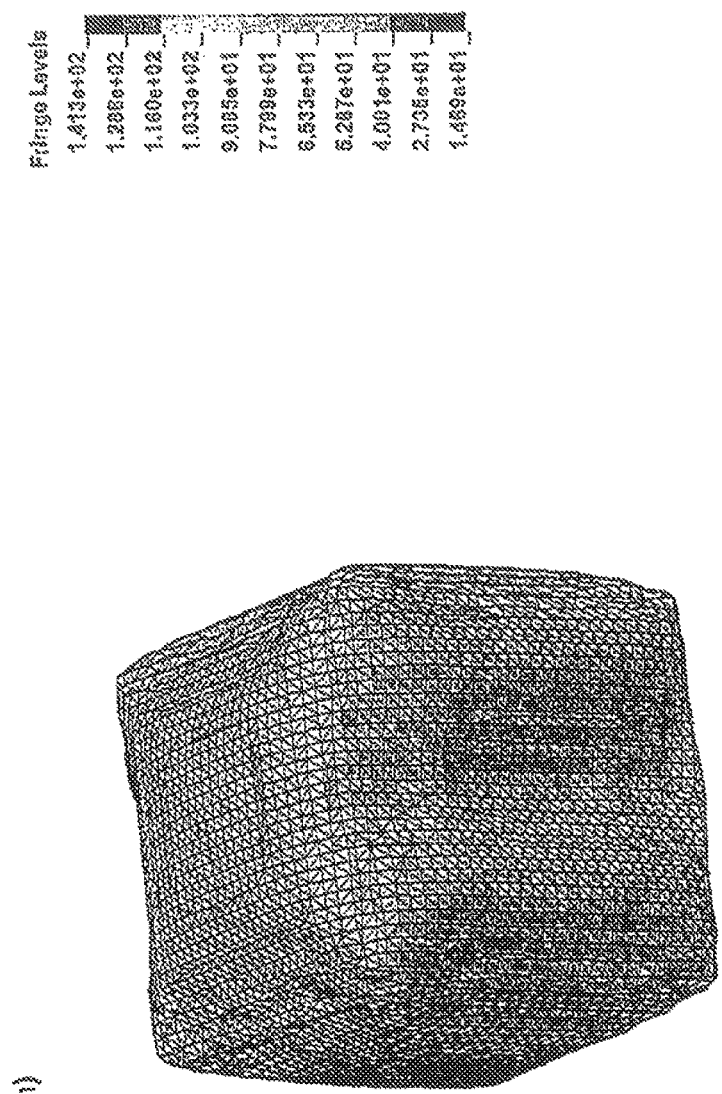
FIG. 19 describes internal pressure of air inside HPEST chamber of this invention before failure (12 atm).
Figure 20:
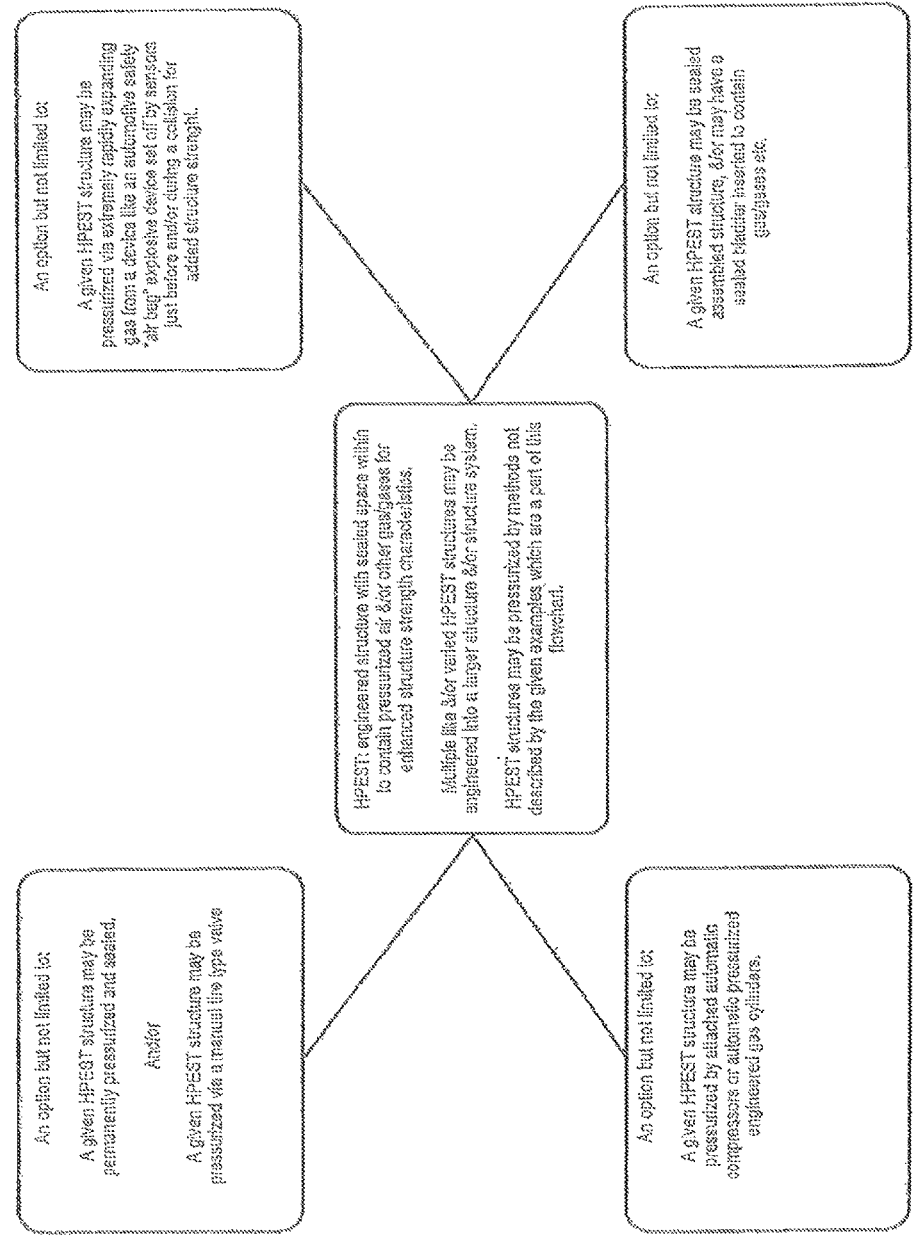
FIG. 20 shows an algorithm of various embodiments of the present invention of high pressure enhanced structure technology "HPEST".

FIGS. 6 to 8 show fringe plots of the plastic strain and Von Mises effective stress as well as the collapsed shape of the chamber for the case of no air entrained. FIGS. 9 to 11 illustrate fringe plots of the plastic strain, Von Mises effective stresses and air pressure inside the HPEST chamber at the point of failure (when the strain in the side wall reach its limit) for the case when the internal air pressure is 1 atm. FIG. 12 shows the fully collapsed chamber when the internal pressure is 1 atm. It should be noted here that the impact loading was applied monotonically even after failure was initiated, which means that structure was pushed to final failure. The values reported so far as failure loads in FIGS. 4 and 5 and corresponding stresses and strains shown by fringe plots in FIGS. 6 to 11 are those at which failure was initiated by air crack development. FIGS. 13 to 15 shows fringe plots for plastic strains, Von Mises effectives, and internal pressure of the inside air for HPEST chamber with 10 atm internal pressure. Noticeable is the increase in the failure load, which is demonstrated by the time of failure initiation. FIG. 16 shows the failed chamber. Similar trend could be also noticed when increasing the air internal pressure to 12 atm as shown in FIGS. 17 to 19.

As the internal pressure of the air inside the HPEST chamber increased to 20 atm, the chamber failed shortly after the impact load is applied. This is expected due to the fact that chamber walls develop tensile stresses due to the air internal pressure. Under high internal pressures, the high tensile stresses in walls made the whole structure brittle. Therefore, it is safe to say that working range of internal pressure for the given HPEST chamber is from 1 to 12 atm, and greater. The fringe plots of the internal pressure in the entrained air indicate a fairly uniform pressure distribution in in fluid inside the chamber. Only areas in the proximity of the impact zone have slightly higher pressure. This confirms that the fluids/gases within would distribute the pressure due to impact on the all surfaces of a structure enclosed within this chamber in addition to absorbing the energy due to the impact, which would allow such structure to withstand higher impact loads.

ii. Summary

HPEST technology of the present invention discloses a series of fully closed structures that may be used within larger structures as shock or impact absorbers to provide protection for certain components to enhance safety. The basic concept relies on the fact that fluid inside such a chamber provides additional structural stiffness that makes the structure more collision resistant. Utilization of nonlinear finite element analysis to provide a quantifiable measure to the HPEST technology of this invention using a cubic steel chamber that is fully closed and filled with air whose internal pressure ranged from 0 atm to 20 atm. The results indicate that the present invention proved to be working as a shock or energy absorber. In the finite element model two edges of the cubes were rigidly constrained to move in order to keep the deformation of the sides until they burst under given monotonic loading is the only mode of failure. In real life application, the HPEST chamber would possibly benefit from a mounting system of pipes or rods connected at the corners, which will also deform and absorb more energy. Thus, the results presented herein are the lowest expected improvement gained from considering the effect of the entrained fluid. In addition to absorbing the energy from impact force, the pressurized fluid inside the HPEST chamber allow the pressure due to impact forces to be relatively evenly distributed/dispersed over all internal surfaces of any structure enclosed within instead of being focused on a finite point of impact area of said structure. This allow maximizing the potential strength of that entire given structure vs. the normal failure of a given structure due to all forces of a given impact being focused on a given finite section of said structure and not being evenly distributed upon all internal surface areas of said structure. The final shape and size of the chamber will depend on the shape, size and nature of the component that the HPEST chamber is desired to be encased within.

D. REFERENCES

1. Du Bois, P., C. C. Chou, B. B. Fileta, T. B. Khalil, A. I. King, H. F. Mahmood, H. J. Mertz, and J. Wismans (2000). "Vehicle Crashworthiness and Occupant Protection", Edited by P. Prasad and J. E. Belwafa, American Iron and steel Institute, Southfield, Mich., USA.
2. American Society for Testing and Materials (1979). "ASTM A572: Standard Specification for High-Strength Low-Alloy Columbium-Vanadium Steels of Structural Quality", ASTM International, West Conshohocken, Pa., USA (DOI: 10.1520/A0572_A0572M-15).
3. Livermore Software Technology Corporation (2007). "LS-DYNA Keyword Users' Manual", Livermore Software Technology Corporation, Livermore, Calif., USA.
4. Hallquist, J. O. (2006). "LS-DYNA Theory Manual", Livermore Software Technology Corporation, Livermore, Calif., USA.
5. LS-DYNA Aerospace Working Group (2014). "Modeling Guidelines Document-Version 14.1", Livermore Software Technology Corporation, Livermore, Calif., USA.
6. Beer, F. P., E. R. Johnston, Jr., D. F. Mazurek, P. J. Cornwell, and E. R. Eisenberg. (2010). "Vector Mechanics for Engineers; Statics and Dynamics", 9th Edition, McGraw-Hill, Toronto, Canada.

It will be appreciated by those persons skilled in the art that changes could be made to the embodiments described above without departing from the broad inventive concept thereof. It is understood, therefore, that this invention is not limited to the particular embodiments disclosed, but is intended to cover modifications that are within the scope of the invention, as defined in the appended claims.

What is claimed is:
1. An article of manufacture comprising:
a single sealed structure having at least one wall forming a sealed inner chamber that is free of liquid, and wherein said sealed inner chamber has an internal surface; and
a gas that is located within said sealed inner chamber, wherein said sealed structure is hermetically sealed in its working position, and wherein said gas exerts a uniform pressure distribution on all of said internal surface of said inner chamber resulting in an improved weight to strength ratio.
2. The article of manufacture of claim 1 wherein said sealed inner chamber has said gas in said chamber under pressure.
3. The article of manufacture of claim 2 wherein said pressure of said sealed inner chamber is either a positive pressure or a neutral pressure of 1 atmosphere.
4. The article of manufacture of claim 2 including one or more sensors located within said sealed inner chamber for monitoring said pressure of said gas within said sealed inner chamber.
5. The article of manufacture of claim 1 wherein said sealed inner chamber contains at least one port wherein said port of said sealed inner chamber has one end that extends through at least one opening of said at least one wall of said sealed structure forming said sealed inner chamber wherein said port of said sealed inner chamber has a valve that allows for the addition of gas into said inner chamber or allows for the escape of gas out of said inner chamber, and wherein said port of said sealed inner chamber is in sealed engagement with said opening of said at least one wall of said sealed structure.
6. The article of manufacture of claim 5 including wherein said port of said sealed inner chamber has a first end that is external to said wall of said sealed structure wherein said first end of said port of said sealed inner chamber accommodates a first end of a tube that is in sealed engagement with said one end of said port of said sealed inner chamber, and wherein said tube has a second end, wherein said second end of said tube accommodates the outlet of a compressor or gas storage cylinder and wherein said outlet of said compressor or said gas storage cylinder is in sealed engagement with said second end of said tube, said compressor or gas storage cylinder supplying gas under pressure through said tube and from said tube into said port of said sealed inner chamber and through said valve of said port of said sealed inner chamber wherein said valve is in an open position, and into said inner chamber.
7. The article of manufacture of claim 6 including one or more sensors located within said sealed inner chamber for monitoring said pressure of said gas within said sealed inner chamber.
8. The article of manufacture of claim 7 including a computer for receiving data transmitted from said one or more sensors to said computer, wherein said computer is interfaced with said compressor or said gas storage cylinder and said valve of said port of said sealed inner chamber, wherein said computer adjusts or maintains the pressure at a desired level within said sealed inner chamber by activation of said compressor or gas storage cylinder and said valve of said port of said sealed inner chamber.
9. The article of manufacture of claim 1 having a sealed bladder located within said sealed inner chamber, and wherein said sealed bladder contains said gas.
10. The article of manufacture of claim 9 wherein said sealed bladder has said gas under pressure.

11. The article of manufacture of claim 10 wherein said pressure of said sealed bladder is either a positive pressure or a neutral pressure of 1 atmosphere.

12. The article of manufacture of claim 10 wherein said sealed bladder has at least one port wherein said port of said sealed bladder has one end that extends through at least one opening of a wall of said sealed bladder and through at least one opening of said wall of said sealed inner chamber wherein said port of said sealed bladder has at least one valve that allows for the addition of gas into said sealed bladder or allows for the escape of gas out of said sealed bladder, and wherein said port of said sealed bladder is in sealed engagement with said opening of said wall of said sealed bladder, or said opening of said wall of said sealed inner chamber, or said opening of said wall of said sealed bladder and said opening of said wall of said sealed inner chamber.

13. The article of manufacture of claim 12 including wherein said one end of said port of said sealed bladder extends through said opening in said wall of said inner chamber, wherein said one end of said port of said sealed bladder accommodates a first end of a tube and wherein said first end of said tube is in sealed engagement with said one end of said port of said sealed bladder, and wherein said tube has a second end, wherein said second end of said tube accommodates the outlet of a compressor or gas storage cylinder and wherein said outlet of said compressor or said gas storage cylinder is in sealed engagement with said second end of said tube, said compressor or said gas storage cylinder supplying gas under pressure through said tube into said port of said sealed bladder and through said valve of said port of said sealed bladder that is in an open position into said sealed bladder.

14. The article of manufacture of claim 13 including one or more sensors located within said sealed bladder for monitoring the pressure within said sealed bladder.

15. The article of manufacture of claim 14 including a computer for receiving data transmitted from said one or more sensors to said computer, wherein said computer is interfaced with said compressor or said gas storage cylinder and said valve of said port of said sealed bladder, wherein said computer adjusts or maintains the pressure at a desired level within said inner chamber by activation of said compressor or said gas storage cylinder and said valve of said port of said sealed bladder.

16. The article of manufacture of claim 13 including one or more sensors located within said sealed inner chamber and one or more sensors located within said sealed bladder for monitoring the pressure of said sealed inner chamber.

17. The article of manufacture of claim 10 including one or more sensors located within said sealed bladder for monitoring the pressure within said sealed bladder.

18. The article of manufacture of claim 9 including wherein the article of manufacture is one or more selected from the group of an automobile, truck, industrial equipment, rail car, boat, aircraft, bicycle, unicycle, tricycle, device, frame, construction component, electronic component, packaging, and weapon.

19. The article of manufacture of claim 1 including wherein the article of manufacture is one or more selected from the group of an automobile, truck, industrial equipment, rail car, boat, aircraft, bicycle, unicycle, tricycle, device, frame, construction component, electronic component, packaging, and weapon.

20. A method of making an article of manufacture comprising:

a single sealed structure having at least one wall forming a sealed inner chamber that is free of liquid, and wherein said sealed inner chamber has an internal surface; and inserting a gas within said sealed inner chamber; and including wherein said sealed structure is hermetically sealed in its working position, and wherein said gas exerts a uniform pressure distribution on all of said internal surface of said inner chamber resulting in an improved weight to strength ratio.

21. The method of claim 20 wherein said sealed inner chamber has said gas in said chamber under pressure.

22. The method of claim 21 wherein said pressure of said sealed inner chamber is either a positive pressure or a neutral pressure of 1 atmosphere.

23. The method of claim 21 including providing one or more sensors located within said sealed inner chamber for monitoring said pressure of said gas within said sealed inner chamber.

24. The method of claim 23 including mounting said one or more sensors to an interior portion of said wall of said sealed inner chamber for monitoring said pressure of said gas within said sealed inner chamber.

25. The method of claim 23 including providing said sensors for transmitting data to a computer concerning said pressure within said sealed inner chamber to a computer.

26. The method of claim 25 including providing said computer for receiving data transmitted from said one or more sensors to said computer, and providing said computer with a computer interface, said computer interface linked to a compressor or a gas storage cylinder and said valve of said port of said sealed inner chamber, wherein said compressor or said gas storage cylinder is in communication with a first end of a tube and wherein a second end of said tube is in communication with said port of said sealed inner chamber, and wherein said computer adjusts or maintains the pressure at a desired level within said sealed inner chamber by activation of said compressor or said gas storage cylinder sending said gas through said tube and activation of said valve of said port of said sealed inner chamber to an open position allowing said gas to flow from said second end of said tube through said open valve of said port of said sealed inner chamber into said sealed inner chamber.

27. The method of claim 20 including providing said sealed inner chamber with a port wherein said port of said sealed inner chamber has one end that extends through at least one opening of said at least one wall of the sealed inner chamber and wherein said port of said sealed inner chamber has a valve that allows for the addition of gas into said sealed inner chamber or allows for the escape of gas out of said sealed inner chamber.

28. The method of claim 27 including providing said port of said inner chamber having one end that is external to said wall of said structure wherein said one end of said port of said sealed inner chamber accommodates a first end of a tube for receiving a gas.

29. A method of making an article of manufacture comprising:

providing a single sealed structure having at least one wall forming a sealed inner chamber that is free of liquid, and wherein said sealed inner chamber has an internal surface; and;

inserting a single sealed bladder within said inner chamber; and providing a gas within said sealed inner chamber and including wherein said sealed structure is hermetically sealed in its working position, and wherein said gas exerts a uniform pressure distribution on all of said internal surface of said inner chamber resulting in an improved weight to strength ratio; and sealing said inner chamber of said sealed structure having said sealed bladder located within said inner chamber for forming a sealed inner chamber having said bladder.

30. The method of claim 29 including placing a gas within said sealed bladder prior to sealing said bladder and prior to inserting said sealed bladder into said inner chamber.

31. The method of claim 30 including providing said gas under pressure in said sealed bladder.

32. The method of claim 31 including providing said gas in either a positive pressure or a neutral pressure of 1 atmosphere within said sealed bladder.

33. The method of claim 29 including providing a port located within a wall of said sealed bladder wherein said port of said sealed bladder extends through at least one opening of said wall of said sealed bladder and through at least one opening in said at least one wall of said sealed inner chamber of said structure wherein said port of said sealed bladder has a valve that allows for the addition of gas into said sealed bladder or allows for the escape of gas out of said sealed bladder, and wherein said port of said sealed bladder is in sealed engagement with said opening of said wall of said sealed bladder and said opening of said wall of said inner chamber of said sealed structure.

34. The method of claim 33 including providing said port of said sealed bladder having one end that is external to said opening of said wall of said sealed structure wherein said one end of said port of said sealed bladder accommodates a first end of a tube for receiving a gas.

35. The method of claim 29 including providing one or more sensors located within said sealed inner chamber for monitoring said pressure of said gas within said sealed inner chamber.

36. The method of claim 35 including mounting said one or more sensors to an interior portion of said wall of said sealed inner chamber for monitoring said pressure of said gas within said sealed inner chamber.

37. The method of claim 35 including providing said sensors for transmitting data to a computer concerning said pressure within said sealed inner chamber to a computer.

38. The method of claim 37 including providing said computer for receiving data transmitted from said one or more sensors to said computer, and providing said computer with a computer interface, said computer interface linked to a compressor or a gas storage cylinder and said valve of said port of said sealed bladder, wherein said compressor or said gas storage cylinder is in communication with a first end of a tube and wherein a second end of said tube is in communication with said one end of said port of said sealed bladder, and wherein said computer adjusts or maintains the pressure at a desired level within said sealed bladder of said inner chamber by activation of said compressor or said gas storage cylinder sending said gas through said tube into said one end of said port of said sealed bladder and through said valve of said port of said sealed bladder that is in an open position said valve activated by said computer allowing said gas to flow from said second end of said tube through said open valve of said port of said sealed bladder into said sealed bladder of said sealed inner chamber.

39. The method of claim 38 including providing one or more sensors located within said sealed inner chamber and one or more sensors located within said sealed bladder for monitoring the pressure of said sealed inner chamber, said sealed bladder, or said inner chamber and said sealed bladder.

40. An article of manufacture comprising:

a single sealed structure having at least one wall forming a sealed inner chamber that is free of liquid, and wherein said sealed inner chamber has an internal surface; and a gas within said sealed inner chamber and including wherein said sealed structure is hermetically sealed in its working position, and wherein said gas exerts a uniform pressure distribution on all of said internal surface of said inner chamber resulting in an improved weight to strength ratio; and a bladder that is in a deflated position located within said sealed inner chamber, wherein said deflated bladder has an inflation system that produces a gas to inflate said deflated bladder upon receiving a signal from a sensor, wherein said sensor is optionally linked to a computer processor.

41. The article of manufacture of claim 40 wherein said sensor is located either externally of said sealed inner chamber or within said sealed inner chamber.

42. The article of manufacture of claim 40 wherein said inflation system comprises a solid propellant and an igniter.

43. The article of manufacture of claim 42 wherein said igniter receives a signal from said sensor which causes said solid propellant to produce a gas wherein said gas inflates said deflated bladder to an inflated bladder under pressure.

44. The article of manufacture of claim 43 wherein said solid propellant is sodium azide (NaN3) and potassium nitrate (KNO3).

45. The article of manufacture of claim 44 wherein said igniter receives a signal from said sensor which causes said solid propellant of sodium azide (NaN3) and potassium nitrate (KNO3) to react to produce nitrogen gas wherein said nitrogen gas inflates said deflated bladder to an inflated bladder under pressure.

46. The article of manufacture of claim 45 wherein said pressure of said inflated bladder is either a positive pressure or a neutral pressure of 1 atmosphere.

47. The article of manufacture of claim 43 wherein said pressure of said inflated bladder is either a positive pressure or a neutral pressure of 1 atmosphere.

* * * * *